US008659749B2

(12) United States Patent
Bridges

(10) Patent No.: US 8,659,749 B2
(45) Date of Patent: Feb. 25, 2014

(54) ABSOLUTE DISTANCE METER WITH OPTICAL SWITCH

(75) Inventor: Robert E. Bridges, Kennett Square, PA (US)

(73) Assignee: Faro Technologies, Inc., Lake Mary, FL (US)

( * ) Notice: Subject to any disclaimer, the term of this patent is extended or adjusted under 35 U.S.C. 154(b) by 478 days.

(21) Appl. No.: 12/849,065

(22) Filed: Aug. 3, 2010

(65) Prior Publication Data

US 2011/0032509 A1   Feb. 10, 2011

Related U.S. Application Data

(60) Provisional application No. 61/232,222, filed on Aug. 7, 2009.

(51) Int. Cl.
*G01C 3/08* (2006.01)

(52) U.S. Cl.
USPC ........................................................ 356/5.13

(58) Field of Classification Search
USPC ........................................................ 356/5.13
See application file for complete search history.

(56) References Cited

U.S. PATENT DOCUMENTS

| 2,682,804 | A | 7/1954 | Clifford et al. |
|---|---|---|---|
| 2,784,641 | A | 3/1957 | Keuffel et al. |
| 3,339,457 | A | 9/1967 | Pun |
| 3,365,717 | A | 1/1968 | Holscher |
| 3,464,770 | A | 9/1969 | Schmidt |
| 3,497,695 | A | 2/1970 | Smith et al. |
| 3,508,828 | A | 4/1970 | Froome et al. |
| 3,619,058 | A | 11/1971 | Hewlett et al. |

(Continued)

FOREIGN PATENT DOCUMENTS

| CN | 1531659 A | 9/2004 |
|---|---|---|
| CN | 101031817 A | 9/2007 |

(Continued)

OTHER PUBLICATIONS

Search Report for Application No. GB1013200.9 dated Nov. 22, 2010.

(Continued)

*Primary Examiner* — Isam Alsomiri
*Assistant Examiner* — Vicente Rodriguez
(74) *Attorney, Agent, or Firm* — Cantor Colburn LLP

(57) ABSTRACT

An absolute distance meter (ADM) that determines a distance to a target includes a light source that emits an emitted light beam. The ADM also includes a fiber switching network having at least one optical switch that switches between at least two positions in response to a switch control signal, a first one of the positions enabling a measure mode in which the emitted light beam is emitted from the fiber switching network towards the target and is reflected back as a measure light beam into the fiber switching network, a second one of the positions enabling a reference mode in which the light beam comprises a reference light beam within the fiber switching network. The ADM further includes a single channel detector that detects the measure and reference light beams in a temporally spaced multiplexed manner and provides an electrical signal which corresponds to the detected measure and reflected light beams. Also, the ADM includes a single channel signal processor that processes the electrical signal and provides a conditioned electrical signal in response thereto, and a data processor that processes the conditioned electrical signal to determine the distance to the target.

22 Claims, 15 Drawing Sheets

(56) References Cited

U.S. PATENT DOCUMENTS

| | | |
|---|---|---|
| 3,627,429 A | 12/1971 | Jaenicke et al. |
| 3,658,426 A | 4/1972 | Vyce |
| 3,728,025 A | 4/1973 | Madigan et al. |
| 3,740,141 A | 6/1973 | DeWitt, Jr. |
| 3,779,645 A | 12/1973 | Nakazawa et al. |
| 3,813,165 A | 5/1974 | Hines et al. |
| 3,832,056 A | 8/1974 | Shipp et al. |
| 3,900,260 A | 8/1975 | Wendt |
| 3,914,052 A | 10/1975 | Wiklund |
| 4,113,381 A | 9/1978 | Epstein |
| 4,297,030 A | 10/1981 | Chaborski |
| 4,403,857 A | 9/1983 | Holscher |
| 4,453,825 A | 6/1984 | Buck et al. |
| 4,498,764 A * | 2/1985 | Bolkow et al. ............... 356/5.06 |
| 4,531,833 A | 7/1985 | Ohtomo |
| 4,632,547 A | 12/1986 | Kaplan et al. |
| 4,689,489 A | 8/1987 | Cole |
| 4,692,023 A * | 9/1987 | Ohtomo et al. ............. 356/5.11 |
| 4,699,508 A | 10/1987 | Bolkow et al. |
| 4,707,129 A | 11/1987 | Hashimoto et al. |
| 4,714,339 A | 12/1987 | Lau et al. |
| 4,790,651 A | 12/1988 | Brown et al. |
| 5,002,388 A | 3/1991 | Ohishi et al. |
| 5,051,934 A | 9/1991 | Wiklund |
| 5,082,364 A | 1/1992 | Russell |
| 5,162,862 A | 11/1992 | Bartram et al. |
| 5,319,434 A | 6/1994 | Croteau et al. |
| 5,400,130 A | 3/1995 | Tsujimoto et al. |
| 5,402,193 A | 3/1995 | Choate |
| 5,416,321 A | 5/1995 | Sebastian et al. |
| 5,440,112 A | 8/1995 | Sakimura et al. |
| 5,455,670 A | 10/1995 | Payne et al. |
| 5,534,992 A | 7/1996 | Takeshima et al. |
| 5,737,068 A | 4/1998 | Kaneko et al. |
| 5,742,379 A | 4/1998 | Reifer |
| 5,754,284 A | 5/1998 | Leblanc et al. |
| 5,764,360 A | 6/1998 | Meier |
| 5,771,623 A | 6/1998 | Pernstich et al. |
| 5,880,822 A | 3/1999 | Kubo |
| 5,886,777 A | 3/1999 | Hirunuma |
| 5,892,575 A * | 4/1999 | Marino ........................ 356/5.01 |
| 5,991,011 A | 11/1999 | Damm |
| D427,087 S | 6/2000 | Kaneko et al. |
| 6,100,540 A | 8/2000 | Ducharme et al. |
| 6,324,024 B1 | 11/2001 | Shirai et al. |
| 6,330,379 B1 * | 12/2001 | Hendriksen .................... 385/16 |
| 6,351,483 B1 | 2/2002 | Chen |
| 6,369,880 B1 | 4/2002 | Steinlechner |
| 6,463,393 B1 | 10/2002 | Giger |
| 6,490,027 B1 | 12/2002 | Rajchel et al. |
| 6,563,569 B2 | 5/2003 | Osawa et al. |
| 6,583,862 B1 | 6/2003 | Perger |
| 6,633,367 B2 | 10/2003 | Gogolla |
| 6,727,985 B2 | 4/2004 | Giger |
| 6,765,653 B2 | 7/2004 | Shirai et al. |
| 6,847,436 B2 | 1/2005 | Bridges |
| 6,859,744 B2 | 2/2005 | Giger |
| 6,864,966 B2 | 3/2005 | Giger |
| 7,023,531 B2 | 4/2006 | Gogolla et al. |
| 7,095,490 B2 | 8/2006 | Ohtomo et al. |
| 7,177,014 B2 | 2/2007 | Mori et al. |
| 7,196,776 B2 | 3/2007 | Ohtomo et al. |
| 7,224,444 B2 | 5/2007 | Stierle et al. |
| 7,248,374 B2 | 7/2007 | Bridges |
| 7,256,899 B1 | 8/2007 | Faul et al. |
| 7,262,863 B2 | 8/2007 | Schmidt et al. |
| 7,327,446 B2 | 2/2008 | Cramer et al. |
| 7,336,346 B2 | 2/2008 | Aoki et al. |
| 7,339,655 B2 | 3/2008 | Nakamura et al. |
| 7,352,446 B2 | 4/2008 | Bridges et al. |
| 7,372,558 B2 | 5/2008 | Kaufman et al. |
| 7,453,554 B2 | 11/2008 | Yang et al. |
| 7,466,401 B2 | 12/2008 | Cramer et al. |
| 7,471,377 B2 | 12/2008 | Liu et al. |
| 7,474,388 B2 | 1/2009 | Ohtomo et al. |
| 7,480,037 B2 | 1/2009 | Palmateer et al. |
| 7,492,444 B2 | 2/2009 | Osada |
| 7,511,824 B2 * | 3/2009 | Sebastian et al. ............. 356/486 |
| 7,518,709 B2 | 4/2009 | Oishi et al. |
| 7,535,555 B2 | 5/2009 | Nishizawa et al. |
| 7,586,586 B2 | 9/2009 | Constantikes |
| D605,959 S | 12/2009 | Apotheloz |
| 7,701,559 B2 | 4/2010 | Bridges et al. |
| 7,738,083 B2 | 6/2010 | Luo et al. |
| 7,751,654 B2 | 7/2010 | Lipson et al. |
| 7,800,758 B1 | 9/2010 | Bridges et al. |
| 7,804,602 B2 | 9/2010 | Raab |
| D629,314 S | 12/2010 | Ogasawara |
| 7,929,150 B1 | 4/2011 | Schweiger |
| 7,990,523 B2 | 8/2011 | Schlierbach et al. |
| 8,087,315 B2 | 1/2012 | Goossen et al. |
| 2003/0133092 A1 * | 7/2003 | Rogers ........................ 356/4.01 |
| 2004/0075823 A1 | 4/2004 | Lewis et al. |
| 2005/0147477 A1 | 7/2005 | Clark |
| 2006/0066836 A1 | 3/2006 | Bridges et al. |
| 2006/0103853 A1 | 5/2006 | Palmateer |
| 2006/0132803 A1 | 6/2006 | Clair et al. |
| 2006/0145703 A1 | 7/2006 | Steinbichler et al. |
| 2006/0222237 A1 | 10/2006 | Du et al. |
| 2007/0016386 A1 | 1/2007 | Husted |
| 2007/0024842 A1 | 2/2007 | Nishizawa et al. |
| 2007/0121095 A1 | 5/2007 | Lewis |
| 2007/0130785 A1 | 6/2007 | Bublitz et al. |
| 2007/0247615 A1 | 10/2007 | Bridges |
| 2008/0239281 A1 | 10/2008 | Bridges |
| 2008/0316497 A1 | 12/2008 | Taketomi et al. |
| 2008/0316503 A1 | 12/2008 | Smarsh et al. |
| 2009/0009747 A1 | 1/2009 | Wolf et al. |
| 2009/0046271 A1 | 2/2009 | Constantikes |
| 2009/0066932 A1 * | 3/2009 | Bridges et al. ............... 356/5.13 |
| 2010/0058252 A1 | 3/2010 | Ko |
| 2010/0128259 A1 | 5/2010 | Bridges et al. |
| 2010/0176270 A1 | 7/2010 | Lau et al. |
| 2010/0207938 A1 | 8/2010 | Yau et al. |
| 2010/0245851 A1 | 9/2010 | Teodorescu |
| 2010/0250175 A1 | 9/2010 | Briggs et al. |
| 2010/0277747 A1 | 11/2010 | Rueb et al. |
| 2011/0032509 A1 | 2/2011 | Bridges |
| 2011/0069322 A1 | 3/2011 | Hoffer, Jr. |
| 2011/0173827 A1 | 7/2011 | Bailey et al. |
| 2011/0260033 A1 | 10/2011 | Steffensen et al. |
| 2012/0262728 A1 | 10/2012 | Bridges et al. |

FOREIGN PATENT DOCUMENTS

| | | |
|---|---|---|
| DE | 3827458 A1 | 2/1990 |
| DE | 202006020299 U1 | 5/2008 |
| EP | 0166106 | 1/1986 |
| EP | 1067363 A2 | 1/2001 |
| EP | 1607767 A1 | 12/2005 |
| EP | 2177868 A2 | 10/2009 |
| EP | 2259010 A1 | 12/2010 |
| EP | 2259013 A1 | 12/2010 |
| JP | 2184788 | 7/1990 |
| JP | 5302976 | 11/1993 |
| JP | 6097288 | 4/1994 |
| JP | 11337642 | 12/1999 |
| JP | 2001272468 | 10/2001 |
| JP | 2002098762 | 4/2002 |
| JP | 2004527751 | 9/2004 |
| JP | 2008514967 | 5/2008 |
| WO | 0177613 A1 | 10/2001 |
| WO | 02084327 | 10/2002 |
| WO | 03062744 A1 | 7/2003 |
| WO | 2008052348 A1 | 5/2008 |
| WO | 2008119073 A2 | 10/2008 |
| WO | 2010141120 A2 | 12/2010 |
| WO | 2010148525 A1 | 12/2010 |

OTHER PUBLICATIONS

Optical Circulator (3-Ports & 4-Ports); [on-line technical data sheet]; Alliance Fiber Optic Products, Inc. REV.D Jan. 15, 2004; Retrieved from www.afop.com.

(56) References Cited

OTHER PUBLICATIONS

Nanona High Speed & Low Loss Optical Swtich; [on-line technical data sheet]; [Retreived Oct. 14, 2010]; Retreived from http://www.bostonati.com/products/PI-FOS.pdf.

Making the Big Step from Electronics to Photonics by Modulating a Beam of Light with Electricity; May 18, 2005; [on-line]; [Retreived May 7, 2009]; Cornell University News Service; Retreived from http://www.news.cornell.edu/stories/May05/LipsonElectroOptical.ws.html.

EOSpace—High-Speed Swtiches; [on-line technical brochure]; [Retreived May 18, 2009]; Retreived from http://www.cospace.com/Switches.htm.

AO Modulator—M040-8J-FxS; [online—technical data sheet]; Gooch & Housego; Nov. 2006; Retreived from http://www.goochandhousego.com/.

2x2 High Speed Lithium Niobate Interferometric Switch; [on-line]; JDS Uniphase Corporation; 2007; Retreived from www.jdsu.com.

Integrated Optical Amplitude Modulator; [on-line technical data sheet]; [Retreived Oct. 14, 2010]; Jenoptik; Retreived from http://www.jenoptik.com/cms/products.nsf/O/A6DF20B50AEE7819C12576FE0074E8E6/$File/amplitudemodulators_en.pdf?Open.

Optical Circulators Improve Bidirectional Fiber Systems; By Jay S. Van Delden; [on-line]; [Retreived May 18, 2009]; Laser Focus World; Retreived from http://www.laserfocusworld.com/display_article/28411/12/nonc/nonc/News/Optical-circulators-improve-bi-directional-fiber-systems.

Lightvision—High Speed Variable Optical Attenuators (VOA); [on-line]; A publication of Lightwaves 2020, Feb. 1, 2008; Retreived from http://www.lightwaves2020.com/home/.

Computer Giants Embrace On-Chip Optics; Mar. 27, 2008; [on-line]; Optics.org; [Retreived on Apr. 2, 2008]; Retreived from http://optics.org/cws/article/research/33521.

MEMS Variable Optical Attenuators Single/Multi-Channel; [on-line]; Jan. 17, 2005; Retreived from www.ozoptics.com.

RS Series Remote Controlled Optical Switch; [on-line technical data sheet]; Sercalo Microtechnology, Ltd. [Retreived Oct. 14, 2010]; Retreived from http://www.sercalo.com/document/PDFs/DataSheets/RS%20datasheet.pdf.

Super-Nyquist Operation of the AD9912 Yields a High RF Output Signal; Analog Devices, Inc., AN-939 Application Note; www.analog.com; Copyright 2007.

Chen, Junewen, "Novel Laser Range Finding Algorithms", Proceedings of SPIE, vol. 6100, Jan. 1, 2006, pp. 61001Q-61001Q-8, XP55031002, ISSN: 0277-786X, DOI: 10.1117/12.645131, the whole document.

FARO Laser Tracker ION; 2 pages; revised Apr. 23, 2010; FARO Technologies, Inc., www.lasertracker.faro.com.

International Search Report of the International Searching Authority for Application No. PCT/US2012/030835; Date of Mailing Jul. 23, 2012.

International Search Report of the International Searching Authority for Application No. PCT/US2012/031368; Date of Mailing Jul. 18, 2012.

International Search Report of the International Searching Authority for PCT/US2012/032715; Date of Mailing Jul. 5, 2012.

International Search Report of the International Searching Authority for Application No. PCT/US2012/033477; Date of Mailing Jul. 20, 2012.

Kester, Walt, Practical Analog Design Techniques, Analog Devices, Section 5, Undersampling Applications, Copyright 1995, pp. 5-1 to 5-34.

Leica Absolute Tracker AT401-ASME B89.4.19-2006 Specifications; Hexagon Metrology; Leica Geosystems Metrology Products, Switzerland; 2 pages; www.leica-geosystems.com/metrology.

Leica Laser Tracker System, Leica Geosystems AG, Jan. 1, 1999, XP002678836, Retrieved from the Internet: URL:http://www.a-solution.com.au/pages/downloads/LTD500_Brochure_EN.pdf [retrieved on 2012] the whole document.

LaserTRACER—measuring sub-micron in space; http://www.etalon-ag.com/index.php/en/products/lasertracer; 4 pages; Jun. 28, 2011; Etalon AG.

Ou-Yang, Mang, et al., "High-Dynamic-Range Laser Range Finders Based on a Novel Multimodulated Frequency Method", Optical Engineering, vol. 45, No. 12, Jan. 1, 2006, p. 123603, XP55031001, ISSN: 0091-3286, DOI: 10.1117/1.2402517, the whole document.

PCMM System Specifications Leica Absolute Tracker and Leica T-Products; Hexagon Metrology; Leica Geosystems Metrology Products, Switzerland; 8 pages; www.leica-geosystems.com/metrology.

Poujouly, Stephane, et al., "A Twofold Modulation Frequency Laser Range Finder; A Twofold Modulation Frequency Laser Range Finder", Journal of Optics. A, Pure and Applied Optics, Institute of Physics Publishing, Bristol, GB, vol. 4, No. 6, Nov. 1, 2002, pp. S356-S363, XP020080997, ISSN: 1464-4258, DOI: 10.1088/1464-4258/4/6/380, the whole document.

Poujouly, Stephane, et al., Digital Laser Range Finder: Phase-Shift Estimation by Undersampling Technique; IEEE, Copyright 1999.

Tracker3; Ultra-Portable Laser Tracking System; 4 pages; 2010 Automated Precision Inc.; www.apisensor.com.

Written Opinion of the International Searching Authority for Application No. PCT/US2012/030835; Date of Mailing Jul. 23, 2012.

Written Opinion of the International Searching Authority for Application No. PCT/US2012/031368; Date of Mailing Jul. 18, 2012.

Written Opinion of the International Searching Authority for PCT/US2012/032715; Date of Mailing Jul. 5, 2012.

Written Opinion of the International Searching Authority for Application No. PCT/US2012/033477; Date of Mailing Jul. 20, 2012.

International Search Report of the International Searching Authority for Application No. PCT/2012/030225; Date of Mailing Sep. 28, 2012.

International Search Report of the International Searching Authority for Application No. PCT/US2012/032971; Date of Mailing Sep. 3, 2012.

International Search Report of the International Searching Authority for Application No. PCT/US2012/0033435; Date of Mailing Sep. 17, 2012.

International Search Report of the International Seracrhing Aurhority for Application No. PCT/YS2012/033720; Date of Mailing Sep. 26, 2012.

Written Opinion of the International Searching Authority for Application No. PCT/US2012/030225; Date of Mailing Sep. 28, 2012.

Written Opinion of the International Searching Authority for Application No. PCT/US2012/032971; Date of Mailing Sep. 3, 2012.

Written Opinion of the International Searching Authority for Application No. PCT/US2012/033435; Date of Mailing Sep. 17, 2012.

Written Opinion of the International Searching Authority for Application No. PCT/US2012/033720; Date of Mailing Sep. 26, 2012.

International Search Report of the International Searching Authority for Application No. PCT/US2012/032970; Date of Mailing Nov. 28, 2012.

International Search Report of the International Searching Authority for Application No. PCT/US2012/032972; Date of Mailing Nov. 28, 2012.

International Search Report of the International Searching Authority for Application No. PCT/US2012/032990; Date of Mailing Dec. 4, 2012.

Written Opinion of the International Searching Authority for Application No. PCT/US2012/032970; Date of Mailing Nov. 28, 2012.

Written Opinion of the International Searching Authority for Application No. PCT/US2012/032972; Date of Mailing Nov. 28, 2012.

Written Opinion of the International Searching Authority for Application No. PCT/US2012/032990; Date of Mailing Dec. 4, 2012.

International Search Report of the International Searching Authority for Application No. PCT/US2012/034611; Date of Mailing Dec. 13, 2012.

Office Action for Japanese Patent Application No. 2010-176909 filed Aug. 6, 2010; issued on Oct. 23, 2012.

Written Opinion of the International Searching Authority for Application No. PCT/US2012/034611; Date of Mailing Dec. 13, 2012.

(56) References Cited

OTHER PUBLICATIONS

Office Action for Japanese Patent Application No. 2010-176909 filed Aug. 6, 2010; issued on Mar. 19, 2013.
Chinese Office Action issued Sep. 22, 2013 for Patent Application No. 201010251189.3.

Matsumaru, K., "Mobile Robot with Preliminary-Announcement and Display Function of Forthcoming Motion Using Projection Equipment," Robot and Human Interactive Communication, 2006. RO-MAN06. The 15th IEEE International Symposium, pp. 443-450, Sep. 6-8, 2006.

* cited by examiner

ABSOLUTE DISTANCE METER WITH OPTICAL SWITCH

CROSS-REFERENCE TO RELATED APPLICATIONS

This application claims the benefit of U.S. Provisional Application Ser. No. 61/232,222 entitled "ABSOLUTE DISTANCE METER WITH OPTICAL SWITCH", filed Aug. 7, 2009, which is incorporated herein by reference in its entirety.

FIELD OF INVENTION

The present invention relates to absolute distance meters, and more particularly to an absolute distance meter having an optical fiber switching network that reduces undesirable drift within the absolute distance meter, thereby providing for more accurate distance measurements.

BACKGROUND

Generally, an absolute distance meter (ADM) is a device that determines the distance to a remote target. It does this by sending laser light to the target and then collecting light that the target reflects or scatters. An ADM may be used to measure distances in one dimension, as might be seen, for example, in a consumer product available at a hardware store. It may be attached into a more complex device having the ability to measure quantities corresponding to additional dimensions (degrees of freedom).

An example of a device of the latter type is the laser tracker, which measures three-dimensional spatial coordinates. Exemplary systems are described by U.S. Pat. No. 4,790,651 to Brown et al. and U.S. Pat. No. 4,714,339 to Lau et al. The laser tracker sends a laser beam to a retroreflector target held against a surface of interest or placed into a fixed nest. The most common type of retroreflector target is the spherically mounted retroreflector (SMR), which may comprise a cube-corner retroreflector mounted within a sphere with the vertex of the cube-corner at the sphere center.

A device that is closely related to the laser tracker is the laser scanner. The laser scanner steps one or more laser beams to points on a diffuse surface. The laser tracker and laser scanner are both coordinate-measuring devices. It is common practice today to use the term laser tracker to also refer to laser scanner devices having distance- and angle-measuring capability. Another device closely related to the laser tracker is the total station, typically used by surveyors. The broad definition of laser tracker, which includes laser scanners and total stations, is used throughout this document.

A radar device is similar to a laser tracker in that it emits and receives electromagnetic waves and analyzes the received waves to learn the distance to a target. Radars usually emit waves in the RF, microwave, or millimeter region of the electromagnetic spectrum, whereas laser trackers usually emit waves in the visible or near-infrared region. Radars may be either bistatic or monostatic. Monostatic radars emit and receive electromagnetic energy along a common path, whereas bistatic radars emit and receive on different paths. Total stations may also be either bistatic or mono static. Laser trackers used for high accuracy industrial measurement, however, are monostatic.

To understand why laser trackers are monostatic, consider a beam emitted by the laser tracker that travels to a retroreflector target and is retroreflected back on itself. If a bistatic mode were used in the tracker, the incident laser beam would strike off the retroreflector center and the reflected laser beam would shift relative to the incident beam. Small-size retroreflector targets of the sort often used with laser trackers would not be compatible with such a bistatic device. For example, a common type of retroreflector target is the 0.5-inch diameter SMR. The cube-corner retroreflector in such an SMR typically has a clear aperture diameter of about 0.3 inch, which equals about 7.5 mm. The $1/e^2$ irradiance diameter of a laser beam from a tracker might be about this large or larger. Consequently, any shift in the laser beam would cause the beam to be clipped by the SMR. This would result in an unacceptably large drop in optical power returned to the tracker.

Bistatic geometry would also be problematic for a fiber-optic based ADM system. In a monostatic laser tracker that launches laser light from an optical fiber, a laser collimator can be made by placing the end face of the optical fiber at the focal point of a collimating lens. On the return path from the distant retroreflector, collimated laser light again strikes the collimating lens, although in general the returning laser beam may be off center with respect to the outgoing laser light. The fiber end face is located at the focus of the collimating lens, which has the effect of causing the light from the retroreflector target to be efficiently coupled back into the fiber, regardless of where the beam strikes the lens. In a bistatic device, alignment of the fiber-optic receiving optics is much more challenging and coupling efficiency is much lower.

One type of laser tracker contains only an interferometer (IFM) without an absolute distance meter. If an object blocks the path of the laser beam from one of these trackers, the IFM loses its distance reference. The operator must then track the retroreflector to a known location to reset to a reference distance before continuing the measurement. A way around this limitation is to put an ADM in the tracker. The ADM can measure distance in a point-and-shoot manner, as described in more detail below. Some laser trackers contain only an ADM without an interferometer. An exemplary laser tracker of this type is described in U.S. Pat. No. 5,455,670 to Payne, et al. Other laser trackers typically contain both an ADM and an interferometer. An exemplary laser tracker of this type is described in U.S. Pat. No. 5,764,360 to Meier, et al.

A gimbal mechanism within the laser tracker may be used to direct a laser beam from the tracker to the SMR. Part of the light retroreflected by the SMR enters the laser tracker and passes onto a position detector. A control system within the laser tracker can use the position of the light on the position detector to adjust the rotation angles of the mechanical azimuth and zenith axes of the laser tracker to keep the laser beam centered on the SMR. In this way, the tracker is able to follow (track) an SMR that is moved over the surface of an object of interest.

Angular encoders attached to the mechanical azimuth and zenith axes of the tracker may measure the azimuth and zenith angles of the laser beam (with respect to the tracker frame of reference). The one distance measurement and two angle measurements performed by the laser tracker are sufficient to completely specify the three-dimensional location of the SMR.

One of the main applications for laser trackers is to scan the surface features of objects to determine their geometrical characteristics. For example, an operator can determine the angle between two surfaces by scanning each of the surfaces and then fitting a geometrical plane to each. As another example, an operator can determine the center and radius of a sphere by scanning the sphere surface.

Prior to U.S. Pat. No. 7,352,446 to Bridges et al., an interferometer, rather than an ADM, was required for the laser tracker to scan moving targets. Until that time, absolute distance meters were too slow to accurately find the position of a moving target. To get full functionality with both scanning and point-and-shoot capability, early laser trackers needed both an interferometer and an ADM.

A general comparison of interferometric distance measurement and absolute distance measurement follows. In the laser tracker, an interferometer (if present) may determine the distance from a starting point to a finishing point by counting the number of increments of known length (usually the half-wavelength of the laser light) that pass as a retroreflector target is moved between the two points. If the beam is broken during the measurement, the number of counts cannot be accurately known, causing the distance information to be lost. By comparison, the ADM in a laser tracker determines the absolute distance to a retroreflector target without regard to beam breaks, which also allows switching between a plurality of targets. Because of this, the ADM is said to be capable of "point-and-shoot" measurement.

Although there are several sources of error in an interferometer measurement, in most cases the dominant error is in the value of the average wavelength of the laser light over its path through the air. The wavelength at a point in space is equal to the vacuum wavelength of the laser light divided by the index of refraction of the air at that point. The vacuum wavelength of the laser is usually known to high accuracy (better than one part in 10,000,000), but the average refractive index of air is known less accurately. The refractive index of air is found by first using sensors to measure the temperature, pressure, and humidity of the air and then inserting these measured values into an appropriate equation, such as the Ciddor equation or the Edlin equation.

However, the temperature, pressure, and humidity are not uniform over space, and neither are the sensors perfectly accurate. For example, an error in the average temperature of one degree Celsius causes an error in the refractive index of about one part per million (ppm). As mentioned above, the wavelength of light in air is inversely proportional to the air refractive index.

Similarly, in an ADM, the so-called ADM wavelength of the amplitude modulation envelope (also known as the ambiguity range) is inversely proportional to the air group refractive index. Because of this similarity, errors in measuring temperature, pressure, and humidity cause errors in calculated distance that are approximately equal for ADM and interferometer systems.

However, ADMs are prone to errors not found in interferometers. To measure distance, an interferometer uses an electrical counter to keep track of the number of times that two beams of light have gone in and out of phase. The counter is a digital device that does not have to respond to small analog differences. By comparison, ADMs are usually required to measure analog values, such as phase shift or time delay, to high precision.

In most high-performance ADMs, laser light is modulated, either by applying an electrical signal to the laser source or by sending the laser light through an external modulator such as an acousto-optic modulator or electro-optic modulator. This modulated laser light is sent out of the ADM to a remote target, which might be a retroreflector or a diffuse surface. Light reflects or scatters off the remote target and passes, at least in part, back into the ADM.

To understand the difficulties faced by ADMs, we consider two common ADM architectures: temporally incoherent architecture and temporally coherent architecture. In some temporally coherent systems, the returning laser light is mixed with laser light from another location before being sent to an optical detector that converts the light into an electrical signal. This signal is decoded to find the distance from the ADM to the remote target. In such systems, modulation may be applied to the amplitude, phase, or wavelength of the laser light. In other temporally coherent systems, several pure laser lines having different wavelengths are combined before being sent to the retroreflector. These different wavelengths of light are combined at the detector, thereby providing "synthetic" modulation.

In temporally incoherent optical systems, light is not usually mixed with light of another wavelength in an optical detector. The simplest type of temporally incoherent system uses a single measure channel and no reference channel. Usually laser light in such systems is modulated in optical power. Light returning from the retroreflector strikes an optical detector that converts the light into an electrical signal having the same modulation frequency. This signal is processed electrically to find the distance from the tracker to the target. The main shortcoming of this type of system is that variations in the response of electrical and optical components over time can cause jitter and drift in the computed distance.

To reduce these errors in a temporally incoherent system, one approach is to create a reference channel in addition to the measure channel. This is done by creating two sets of electronics. One set of electronics is in the measure channel. Modulated laser light returned from the distant retroreflector is converted by an optical detector to an electrical signal and passes through this set of electronics. The other set of electronics is in the reference channel. The electrical modulation signal is applied directly to this second set of electronics. By subtracting the distance measured in the reference channel from the distance found in the measure channel, jitter and drift are reduced in ADM readings. This type of approach removes much of the variability caused by electrical components, especially as a function of temperature. However, it cannot remove variability arising from differences in electro-optical components such as the laser and detector.

To reduce these errors further, part of the modulated laser light can be split off and sent to an optical detector in the reference channel. Most of the variations in the modulated laser light of the measure and reference channels are common mode and cancel when the reference distance is subtracted from the measure distance.

Despite these improvements, drift in such ADM systems can still be relatively large, particularly over long time spans or over large temperature changes. All of the architectures discussed above are subject to drift and repeatability errors caused by variations in optical and electrical elements that are not identical in the measure and reference channels. Optical fibers used in ADM systems change optical path length with temperature. Electrical assemblies used in ADM systems, such as amplifiers and filters, change electrical phase with temperature.

A method and apparatus for greatly reducing the effects of drift in an ADM within a laser tracker is taught in U.S. Pat. No. 6,847,436 to Bridges, the contents of which are herein incorporated by reference. This method involves use of a chopper assembly to alternately redirect returning laser light to a measure or reference path. Although this method works well, there is a limitation in the maximum rate of rotation of the chopper wheel and hence in the data collection rate of the ADM.

A method of measuring the distance to a moving retroreflector is taught in U.S. Pat. No. 7,352,446 to Bridges et al., the contents of which are herein incorporated by reference. To obtain the highest possible performance using the method of U.S. Pat. No. 7,352,446, the distances are recomputed at a high rate, preferably at a rate of at least 10 kHz. It is difficult to make a mechanical chopper as in U.S. Pat. No. 6,847,436 with a data rate this high. Hence another method needs to be found to solve the ADM drift problem.

It is possible to correct for drift in a distance meter by mechanically switching an optics beam between two free-space optical paths. One optical path, which is called the reference path, is internal to the instrument. The second optical path, which is called the measure path, travels out from the instrument to the object being measured and then back to the instrument. Light from the measure and reference paths strikes a single optical detector. Because of the action of the mechanical switch, the light from the two reference paths does not strike the single optical detector at the same time. The mechanical switch may be a mechanically actuated optical component such as a mirror, prism, beam splitter, or chopper wheel. The actuator may be a solenoid, motor, voice coil, manual adjuster, or similar device. Because the optical detector and electrical circuitry is the same for the measure and reference paths, almost all drift error is common mode and cancels out. Examples of inventions based on this method include U.S. Pat. No. 3,619,058 to Hewlett et al.; U.S. Pat. No. 3,728,025 to Madigan et al.; U.S. Pat. No. 3,740,141 to DeWitt; U.S. Pat. No. 3,779,645 to Nakazawa et al.; U.S. Pat. No. 3,813,165 to Hines et al.; U.S. Pat. No. 3,832,056 to Shipp et al.; U.S. Pat. No. 3,900,260 to Wendt; U.S. Pat. No. 3,914,052 to Wiklund; U.S. Pat. No. 4,113,381 to Epstein; U.S. Pat. No. 4,297,030 to Chaborski; U.S. Pat. No. 4,453,825 to Buck et al.; U.S. Pat. No. 5,002,388 to Ohishi et al.; U.S. Pat. No. 5,455,670 to Payne et al.; U.S. Pat. No. 5,737,068 to Kaneko et al.; U.S. Pat. No. 5,880,822 to Kubo; U.S. Pat. No. 5,886,777 to Hirunuma; U.S. Pat. No. 5,991,011 to Damm; U.S. Pat. No. 6,765,653 to Shirai et al.; U.S. Pat. No. 6,847,436 to Bridges; U.S. Pat. No. 7,095,490 to Ohtomo et al.; U.S. Pat. No. 7,196,776 to Ohtomo et al.; U.S. Pat. No. 7,224,444 to Stierle et al.; U.S. Pat. No. 7,262,863 to Schmidt et al.; U.S. Pat. No. 7,336,346 to Aoki et al.; U.S. Pat. No. 7,339,655 to Nakamura et al.; U.S. Pat. No. 7,471,377 to Liu et al.; U.S. Pat. No. 7,474,388 to Ohtomo et al.; U.S. Pat. No. 7,492,444 to Osada; U.S. Pat. No. 7,518,709 to Oishi et al.; U.S. Pat. No. 7,738,083 to Luo et al.; and U.S. Published Patent Application No. US2009/0009747 to Wolf et al. Because all of these patents use mechanical switches, which are slow, none can switch quickly enough to be used in an ADM that accurately measures a moving retroreflector.

Another possibility is to correct drift only in the electrical, and not the optical, portion of a distance meter. In this case, light from the reference optical path is sent to the reference optical detector and light from the measure optical path is sent to the measure optical detector. The electrical signals from the reference and optical detectors travel to an electrical switch, which alternately routes the electrical signals from the two detectors to a single electrical unit. The electrical unit processes the signals to find the distance to the target. Examples of inventions based on this method include: U.S. Pat. No. 3,365,717 to Hölscher; U.S. Pat. No. 5,742,379 to Reifer; U.S. Pat. No. 6,369,880 to Steinlechner; U.S. Pat. No. 6,463,393 to Giger; U.S. Pat. No. 6,727,985 to Giger; U.S. Pat. No. 6,859,744 to Giger; and U.S. Pat. No. 6,864,966 to Giger. Although the use of an electrical switch can reduce drift in the electrical portion of an ADM system, it cannot remove drift from the optical portion, which is usually as large or larger than the drift in the electrical portion. In addition, it is difficult to implement an electrical switching system that can switch quickly enough to avoid a phase shift in electrical signals modulated at several GHz. Because of their limited utility and difficulty of implementation, electrical switches are not a good solution for correcting drift in an ADM.

For a bistatic distance meter, there are two references that discuss the use of fiber optic switches. U.S. Published Patent Application No. US2009/0046271 to Constantikes teaches a method in which one fiber switch is placed in the outgoing beam path and a second fiber switch is placed in the returning beam path. These two fiber optic switches are switched at the same time to either permit light from the measure or reference path to reach the optical detector. U.S. Pat. No. 4,689,489 to Cole teaches use of a fiber switch in which light from the return port of the bistatic distance meter is into one port of a switch and light from the outgoing beam is fed into the second port of the switch. The fiber-switch architectures described in these references apply only to bistatic devices and cannot be used with laser trackers for reasons discussed earlier.

There is a need for an ADM that accurately measures moving targets with little drift. It must be monostatic and minimize drift in both optical and electrical components.

SUMMARY

According to an aspect of the present invention, an absolute distance meter (ADM) that determines a distance to a target includes a light source that emits an emitted light beam. The ADM also includes a fiber switching network having at least one optical switch that switches between at least two positions in response to a switch control signal, a first one of the positions enabling a measure mode in which the emitted light beam is emitted from the fiber switching network towards the target and is reflected back as a measure light beam into the fiber switching network, a second one of the positions enabling a reference mode in which the light beam comprises a reference light beam within the fiber switching network. The ADM further includes a single channel detector that detects the measure and reference light beams in a temporally spaced multiplexed manner and provides an electrical signal which corresponds to the detected measure and reference light beams. Also, the ADM includes a single channel signal processor that processes the electrical signal and provides a conditioned electrical signal in response thereto, and a data processor that processes the conditioned electrical signal to determine the distance to the target.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
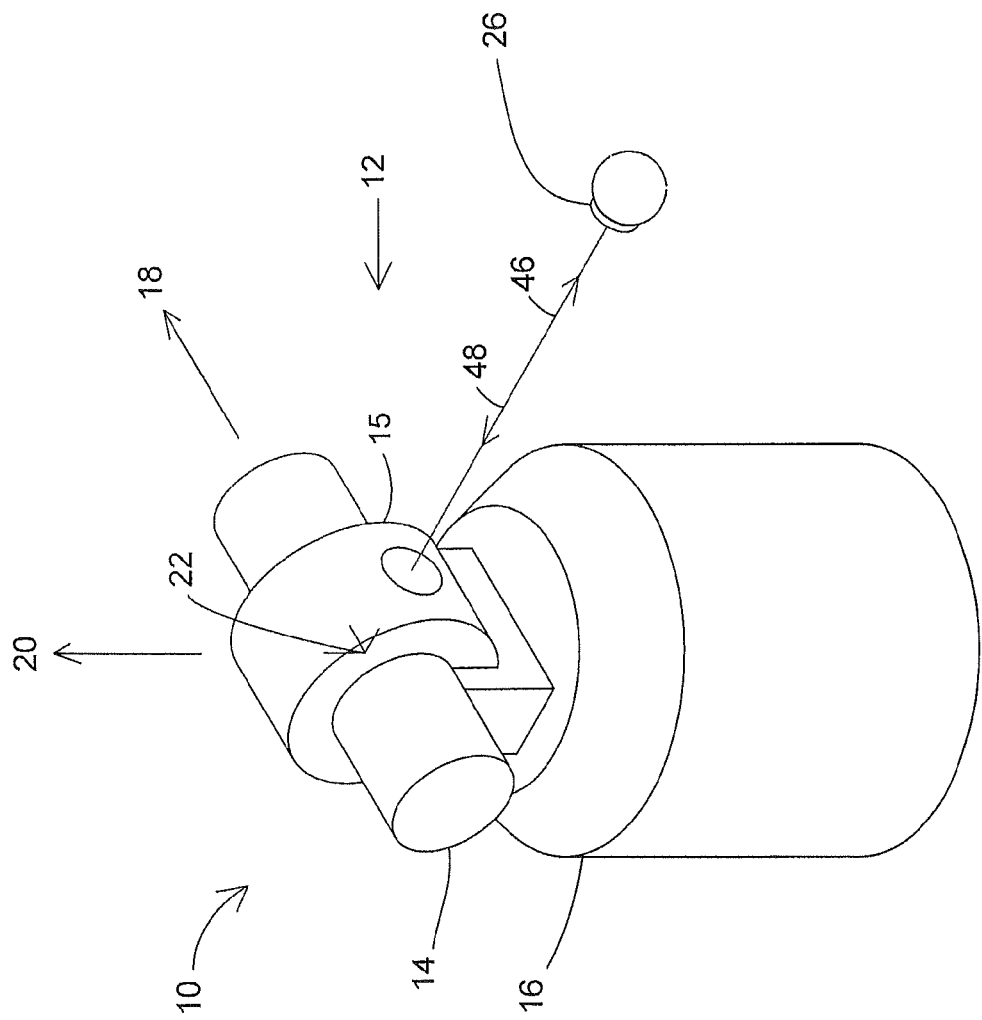
FIG. 1 is a perspective view of an exemplary laser tracker sending a laser beam to an external retroreflector.

An exemplary laser tracker 10 is illustrated in FIG. 1. An exemplary gimbaled beam-steering mechanism 12 of laser tracker 10 comprises zenith carriage 14 mounted on azimuth base 16 and rotated about azimuth axis 20. Payload 15 is mounted on zenith carriage 14 and rotated about zenith axis 18. Zenith mechanical rotation axis 18 and azimuth mechanical rotation axis 20 intersect orthogonally, internally to tracker 10, at gimbal point 22, which is typically the origin for distance measurements. Laser beam 46 virtually passes through gimbal point 22 and is pointed orthogonal to zenith axis 18. In other words, laser beam 46 is in the plane normal to zenith axis 18. Laser beam 46 is pointed in the desired direction by rotation of payload 15 about zenith axis 18 and by rotation of zenith carriage 14 about azimuth axis 20. Zenith and azimuth angular encoders, internal to the tracker (not shown), are attached to zenith mechanical axis 18 and azimuth mechanical axis 20 and indicate, to high accuracy, the angles of rotation. Laser beam 46 travels to external retroreflector 26 such as the spherically mounted retroreflector (SMR) described above. By measuring the radial distance between gimbal point 22 and retroreflector 26 and the rotation angles about the zenith and azimuth axes 18, 20, the position of retroreflector 26 is found within the spherical coordinate system of the tracker.

Laser beam 46 may comprise one or more laser wavelengths, as will be described in the discussion that follows. For the sake of clarity and simplicity, a steering mechanism of the sort shown in FIG. 1 is assumed in the following discussion. However, other types of steering mechanisms are possible. For example, it would be possible to reflect a laser beam off a minor rotated about the azimuth and zenith axes. The techniques described here are applicable, regardless of the type of steering mechanism.

Elements of the Laser Tracker

Figure 2A:
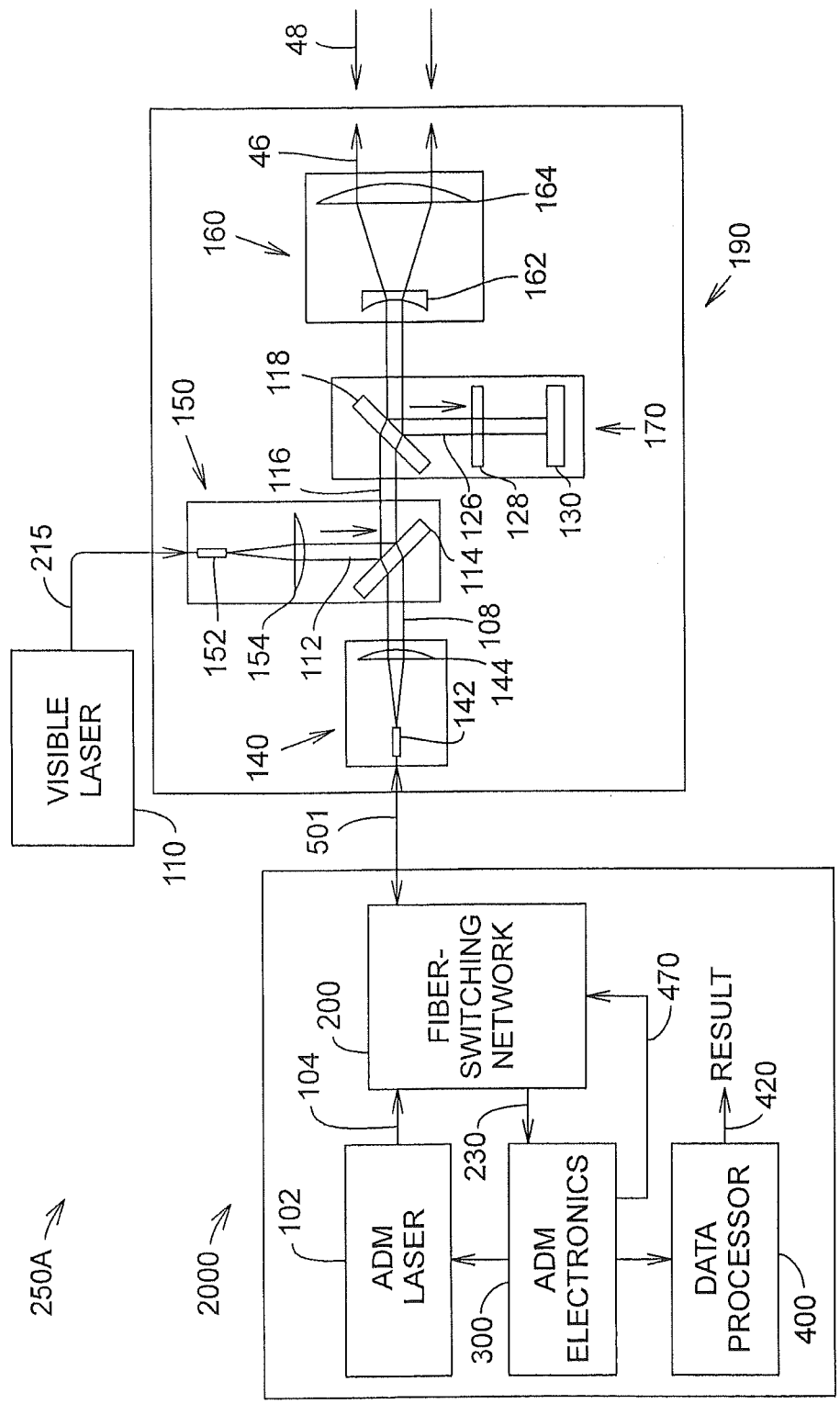
FIG. 2A is a block diagram of a tracker electro-optics assembly including an ADM with an optical fiber switching network, visible laser, and tracker optics.

Tracker electro-optics assembly 250A is shown in FIG. 2A. It comprises ADM assembly 2000, visible laser 110, and optical assembly 190. ADM assembly 2000 comprises ADM electronics 300, ADM laser 102, optical fiber switching network 200, and data processor 400. Optical assembly 190 comprises ADM beam collimator 140, visible-beam launch 150, tracking assembly 170, and beam expander 160.

There are many ways to modulate light. One type of modulation is of optical power, with the modulation signal usually either sinusoidal or pulsed. Another type of modulation is of optical wavelength. This type of modulation is sometimes used in coherent laser distance meters. Modulation may be applied directly to the light source or to an external modulator, such as an electro-optic modulator, to vary the power, polarization, or phase of the laser light. The method described in this disclosure is applicable to any of these types of modulation. Light can come from a laser, superluminescent diode, or any other type of optical emitter. In the text below, the light source is often referred to as a laser, but this should not be taken to limit the type of light source that could be used.

Light from ADM laser 102 is injected into optical fiber 104 and travels to fiber switching network 200. Some light from fiber switching network 200 travels through fiber optic cable 501 to ADM beam collimator 140. ADM beam collimator 140 comprises stable ferrule 142 and positive lens 144. Optical fibers are preferably of the single-mode type.

In the event that ADM laser 102 operates at an infrared wavelength, it is convenient to provide a visible laser beam to help make the beam easier to find. Visible laser 110 sends visible light through fiber optic cable 215 to visible-beam launch 150, which comprises stable ferrule 152, positive lens 154, and dichroic beam splitter 114. Dichroic beam splitter 114 transmits ADM beam 108 but reflects visible beam 112. To the right of beam splitter 114, composite laser beam 116 comprises visible laser beam 112 and ADM laser beam 108, which are substantially collinear. Laser beam 116 passes through beam splitter 118 and beam expander 160, emerging as a larger collimated laser beam 46. Beam expander 160 comprises negative lens 162 and positive lens 164.

Figure 2B:
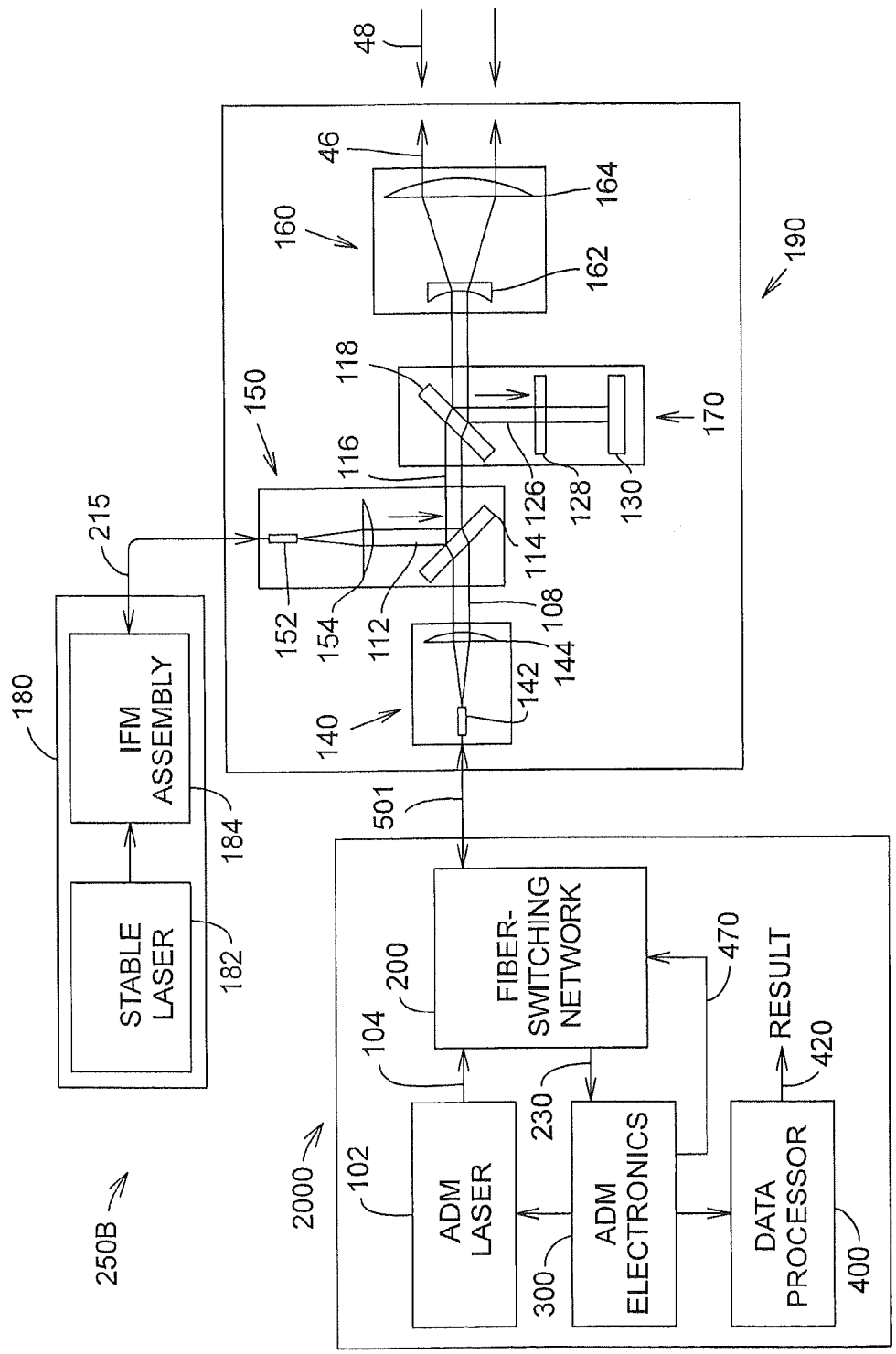
FIG. 2B is a block diagram of a tracker electro-optics assembly including an ADM with an optical fiber switching network, incremental distance meter assembly, and tracker optics.

In some applications, it is desirable to include an interferometer (IFM) in addition to an ADM. Tracker electro-optics assembly 250B is shown in FIG. 2B. It comprises the same elements as electro-optics assembly 250A except that visible laser 110 is replaced with incremental distance meter assembly 180. Incremental distance meter assembly 180 comprises stable laser 182 and interferometer (IFM) assembly 184. Stable laser 182 is preferably a frequency stabilized helium-neon laser that produces a red beam. IFM assembly 184 comprises optics and electronics (not shown) that measure the incremental change in distance to retroreflector 26.

Laser beam 46 travels to external retroreflector 26, as shown in FIG. 1. Beam 46 reflects off retroreflector 26 and returns to laser tracker 10 as beam 48. If laser beam 46 strikes the center of retroreflector 26, reflected laser beam 48 retraces the path of the incident laser beam 46. If laser beam 46 strikes the retroreflector 26 off the center, reflected laser beam 48 returns parallel to incident beam 46 but offset from it. Reflected laser beam 48 re-enters tracker 10 through beam expander 160 and retraces the path back through the optical system.

Tracking assembly 170 comprises beam splitter 118, optional optical filter 128, and position detector 130. Some of reflected laser beam 48 bounces off beam splitter 118 and passes through optional optical filter 128 to strike position detector 130. Optical filter 128 blocks undesirable wavelengths of light, such as ambient light in the vicinity of retroreflector 26.

Position detector 130 produces an electrical signal that indicates the position of the spot of light on position detector 130. Position detector 130 may be any type of detector that indicates the position of the returning light beam. For example, it may be a position sensitive detector such as a lateral effect detector or quadrant detector or it may be a photosensitive array such as CCD or CMOS array. The retrace point of the position detector is defined as the point that laser beam 126 strikes if laser beam 46 strikes the center of retroreflector 26. When laser beam 46 moves off the center of retroreflector 26, laser beam 126 moves off the retrace point and causes the position detector 130 to generate an electrical error signal. A servo system (not shown) processes this error signal to activate motors (not shown) that turn laser beam 46 from laser tracker 10 toward the center of the external retroreflector 26. By this means, the laser beam from tracker 10 is made to track the movement of retroreflector 26.

Dichroic beam splitter 114 transmits the returning ADM laser light through ADM beam collimator 140, where it is coupled into optical fiber 501. The laser light travels back into fiber switching network 200, and a part of it travels through optical fiber 230 to ADM electronics 300. ADM electronics 300 converts the optical signal into an electrical signal and conditions the electrical signal in a way appropriate for the particular type of modulation applied to the laser light. The signal from ADM electronics 300 is sent to data processor 400, which processes the signal to find result 420, the distance from tracker gimbal point 22 to retroreflector target 26.

The components of tracker electro-optics assembly 250A, 250B may be located entirely within tracker payload 15, located partly within tracker payload 15 and partly within azimuth base 16, or located entirely within azimuth base 16. If ADM or interferometer components are located in azimuth base 16, these may be connected to optical components by routing fiber optic cables through the mechanical azimuth and zenith axes into payload 15. This method is shown in WO 2003/062744, which is incorporated herein by reference. Alternatively, if ADM or interferometer components are located in azimuth base 16, the light emitted by ADM laser 102 or stable laser 182 may be sent through free space to a beam steering mirror located in the payload. This method is shown in U.S. Pat. No. 4,714,339 to Lau et al.

Optical fiber switching network 200 provides a means of routing and switching optical signals to and from optical assembly 190. Fiber switching network 200 is described in more detail below.

Figure 3:
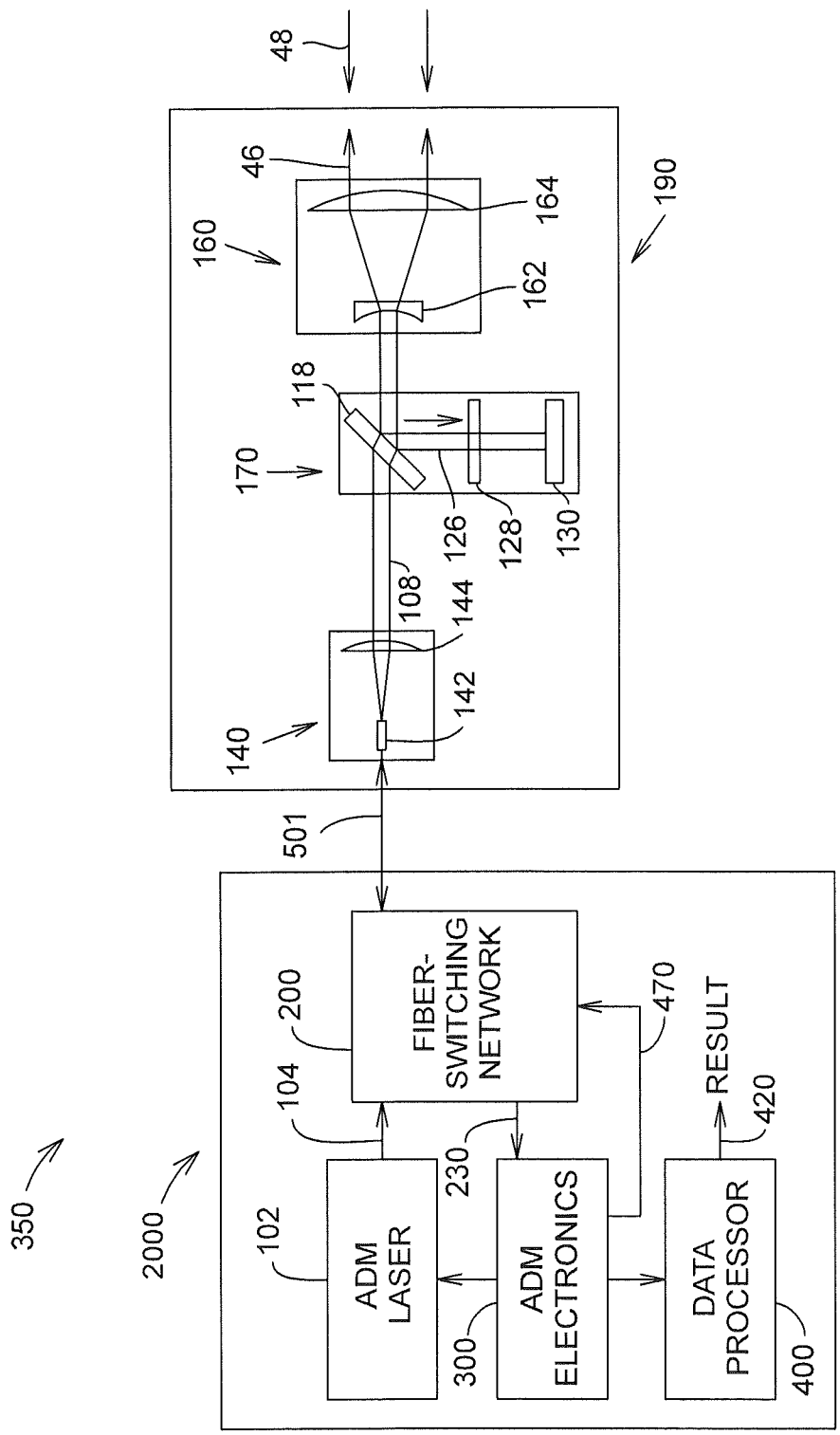
FIG. 3 is a block diagram of a tracker electro-optics assembly including an ADM with an optical fiber switching network and tracker optics.

It is possible to eliminate visible-light laser 110 in FIG. 2A or incremental distance meter assembly 180 in FIG. 2B. In this case, visible-beam launch 150 is not necessary. The resulting electro-optics assembly 350 is shown in FIG. 3. This architecture might be appropriate if an IFM were not needed and if ADM laser 102 emitted visible laser light. It might also be appropriate if the IFM were not needed and if a visible pointer beam was not needed.

Figure 4:
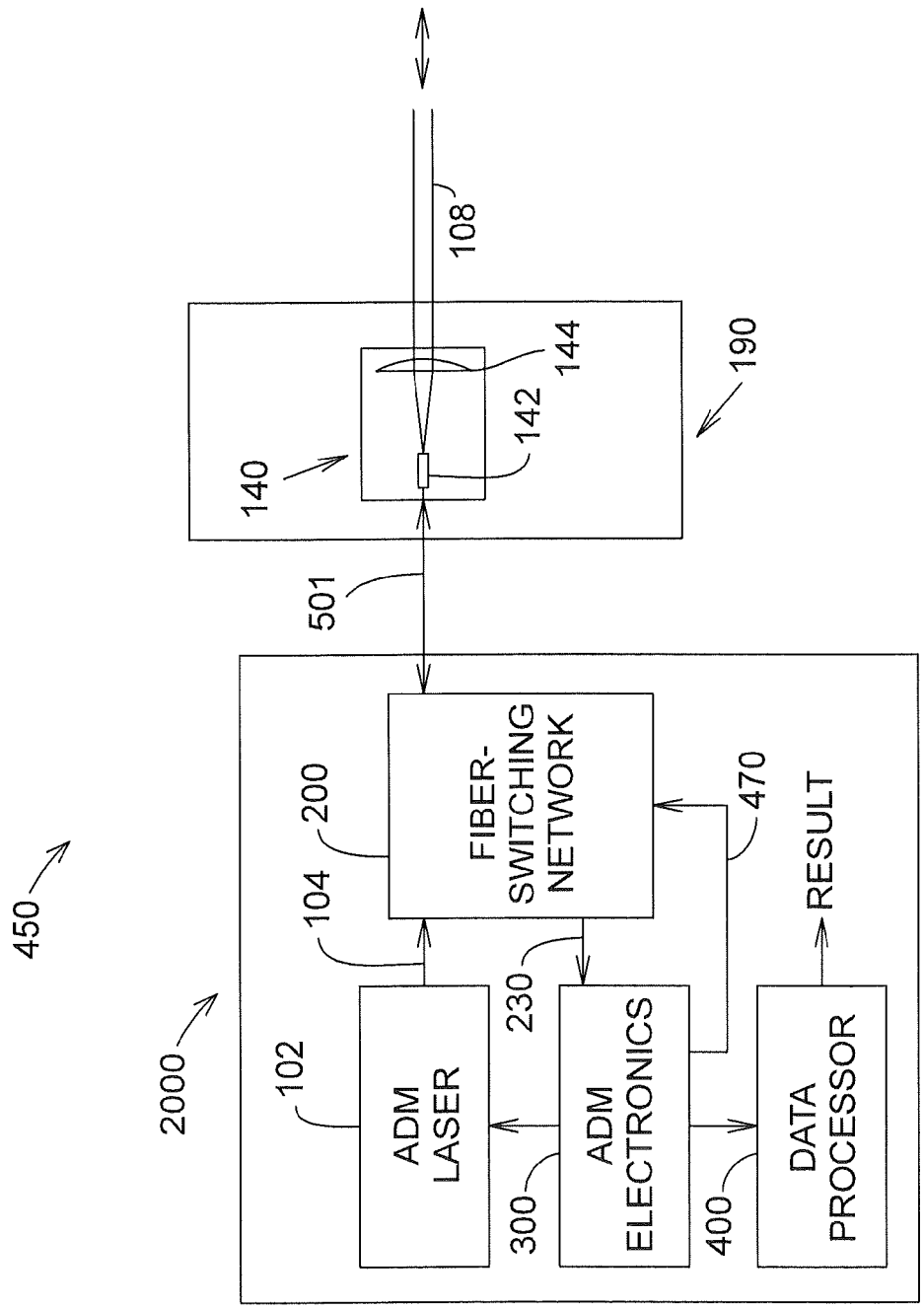
FIG. 4 is a block diagram of a tracker electro-optics assembly including an ADM with an optical fiber switching network and simplified optics.

For handheld distance meters or other instruments that do not track, the architecture can be further simplified by eliminating tracking assembly 170 and possibly beam expander 160. The resulting ADM distance meter 450 is shown in FIG. 4.

FIGS. 2A, 2B, 3, and 4 all contain ADM assembly 2000, which contains optical fiber switching network 200. The benefit of fiber switching network 200 is that it enables a reduction in the drift of the ADM distance readings. The reason for this reduction can be understood by considering ADM electronics 300 in more detail. A specific embodiment for the ADM electronics is considered in the discussion that accompanies FIGS. 10 and 11; that is, in conjunction with a laser tracker. However, the advantages of the fiber switching network for reducing drift in an ADM system applies more generally to ADM systems and may include for example pulsed time-of-flight ADMs, chirped ADMs, and coherent as well as incoherent ADMs. To explain how fiber switching network 200 enables the reduction in drift, reference is now made to FIG. 16, which describes the elements of ADM electronics 300 in more general terms.

Figure 16:
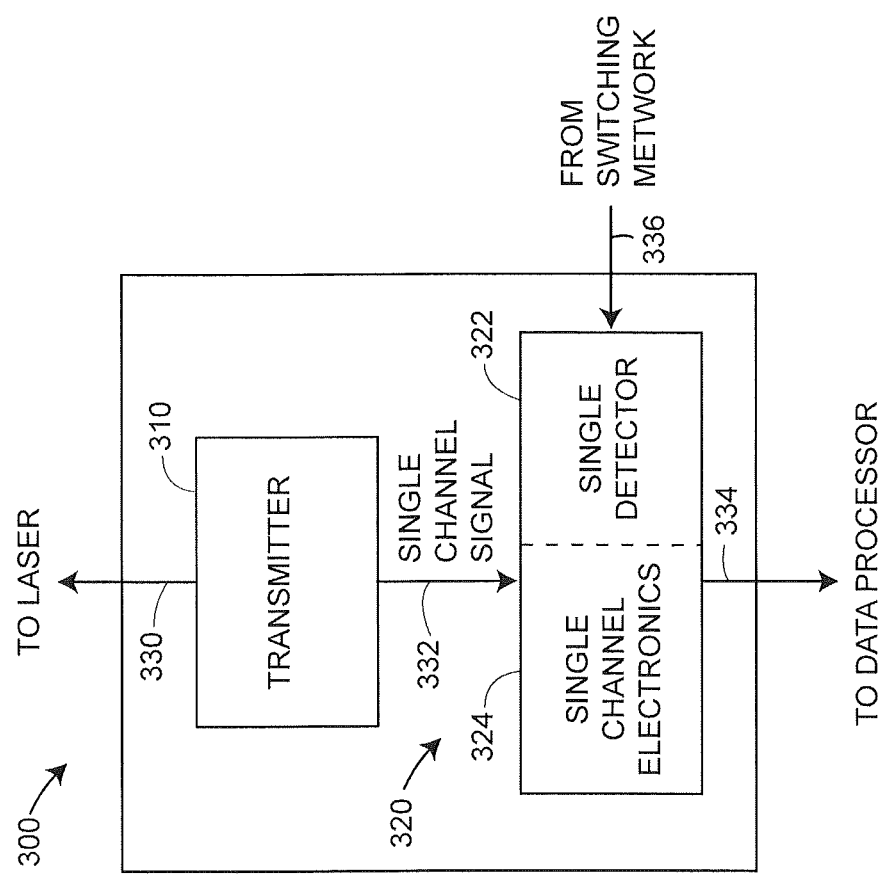
FIG. 16 is a block diagram of ADM electronics used in embodiments of the present invention.

In FIG. 16, ADM electronics 300 comprises laser transmitter 310, single channel laser receiver 320, single channel signal line 332, and interconnection lines 330, 334, and 336. Laser transmitter 310 may generate a variety of signals. A signal from interconnection line 330 is used to modulate ADM laser 102. In addition, most types of ADM systems generate one or more additional signals used in processing of the signal in single channel receiver 320. The combination of such signals is referred to here as the single channel signal 332, for reasons that will become clear in the discussion that follows.

Single channel receiver 320 comprises single detector 322 and single channel electronics 324. Light arrives at single detector 322 over interconnection line 336, which is a fiber optic cable attached to fiber switching network 200. Single detector 322 converts the optical signal from 336 to an electrical signal. This electrical signal is processed by single channel electronics, and the resulting processed signal is sent over interconnection line 334 to data processor 400.

The drift seen in ADM systems is generally the result of changes in the electrical and optical systems over time and especially with respect to changes in temperature. In the Background section of this document, it was explained that ADM systems often try to remove the effects of such changes by subtracting the readings of a reference channel from those of a measure channel. As explained, the signal in the reference channel can be optical or electrical, with an optical reference signal generally producing the highest performance. The use of two channels in this way can only correct drift to a limited degree because two separate electrical channels are required in the receiver unit—one for the measure channel and one for the reference channel. If the reference signal is optical, the receiver unit must also provide two separate optical detectors—one for the measure channel and one for the reference channel. However, the electrical and optical components within the two channels are not identical and neither are the temperatures of the components in each of the channels. Consequently, drift seen within the measure and reference channels is not completely common mode and does not completely cancel out.

By using a fiber switching network to multiplex optical signals, it is possible to use a single detector to serve both measure and reference channels. It is also possible to use a single electrical channel, rather than two electrical channels, in the receiver. Because there is only a single electrical receiver channel, any electrical signals supplied by transmitter 310 need to be provided in only a single channel. The result of the single optical detector, the single electrical receiver channel, and the single channel signals from the transmitter is a nearly complete cancellation of drift effects. The resulting ADM system is nearly drift free.

Fiber Switching Network

Figure 5:
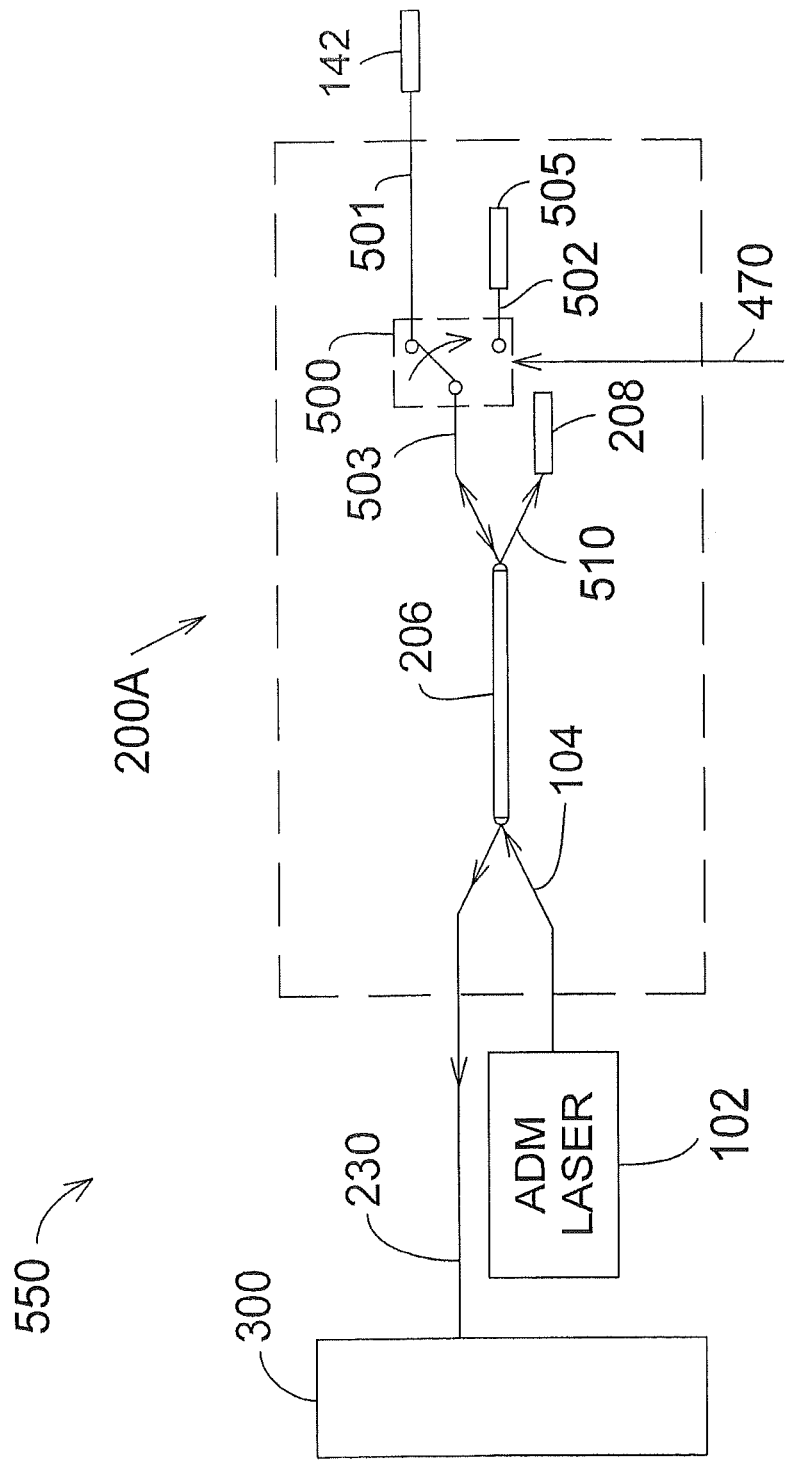
FIG. 5 shows an optical fiber switching network that includes a fiber optic switch, optical coupler, and a partial fiber retroreflector according to an embodiment of the present invention.

Several possible embodiments of an optical fiber switching network 200 in accordance with the present invention are discussed here. These are labeled as 200A-200E in FIGS. 5-9, respectively. FIG. 5 shows ADM system 550, which comprises ADM laser 102, fiber switching network 200A, ADM electronics 300, and stable ferrule 142. Fiber switching network 200A comprises fiber optic coupler 206, fiber-optic switch 500, partial fiber retroreflector 505, interconnecting optical fibers 104, 230, 501, 502, 503, 510, and electrical connection 470. Light travels from ADM laser 102 through optical fiber 104 into optical coupler 206. Part of the light from fiber coupler 206 travels to low-reflection termination (LRT) 208, which absorbs almost all of the light. Preferably, the reflectance of LRT 208 is less than $1/50000$. The rest of the light from fiber coupler 206 travels through optical fiber 503 to optical switch 500. In this case fiber-optic switch 500 is a single-pole double throw (SPDT) switch, but other types of switches could be used.

Electrical connection 470 sends to fiber-optic switch 500 an electrical signal that controls whether the optical signal is routed to optical fiber 501 or optical fiber 502. If switch 500 routes light to optical fiber 501, light passes from stable ferrule 142 through the tracker and out to retroreflector 26. The returning laser light travels to fiber-optic switch 500, through coupler 206, through fiber 230, and into ADM electronics 300. Light that travels along this path to and from the retroreflector is said to be in the measure path and, during this time, the tracker is said to be in the measure mode.

If switch 500 routes light to optical fiber 502, light passes to partial fiber retroreflector 505, which reflects a fraction of laser light back through coupler 206, through fiber 230, and into ADM electronics 300. Light that travels internal to the tracker by reflecting off partial fiber retroreflector 505 is said to be in the reference path and, during this time, the tracker is said to be in the reference mode.

Fiber coupler 206 is preferably a 50/50 coupler, also known as a 3 dB coupler. For light injected into a 50/50 coupler 206 by ADM laser 102, 50% of the laser light goes to optical fiber 510 and 50% goes to optical fiber 503. For light injected into coupler 206 from the reverse direction, 50% of the returning light goes to ADM laser 102 and 50% of the returning light goes to ADM electronics 300. Faraday isolation is provided within ADM laser 102 to prevent light that passes through fiber coupler 206 to ADM laser 102 from destabilizing the laser.

The amount of light returned to optical fiber 501 after the light has traveled to retroreflector 26 depends on a number of factors including the distance to the retroreflector, the diameter and tilt of the retroreflector, and the coupling efficiency of the ADM beam collimator 140. The reflectance of partial fiber retroreflector 505 is preferably selected to reflect laser power approximately equal to the average of powers returned by retroreflector 26 under different measurement conditions.

Fiber-optic switch 500 should preferably have optical isolation between the two switching positions of at least 20 dB. This means that, when the switch is in the up position, the amount of optical power that leaks into the down position is less than that applied to the up position by a factor of at least 100. After reflecting and retracing the path, isolation is reduced by another factor of 100, so that the overall effective isolation is a factor of $10^4$, or 40 dB. Switches with lower levels of isolation can be used by combining them to increase their overall isolation, as explained below.

In addition to optical isolation, fiber-optic switch 500 should preferably have optical return loss of at least 40 dB. This means that the light reflected back by the switch should be reduced by a factor of at least 10,000 compared to the incident light. This ensures that excessive unwanted light is not reflected onto the light traveling on the desired path and thereby reducing the accuracy of the measurement.

Figure 6:
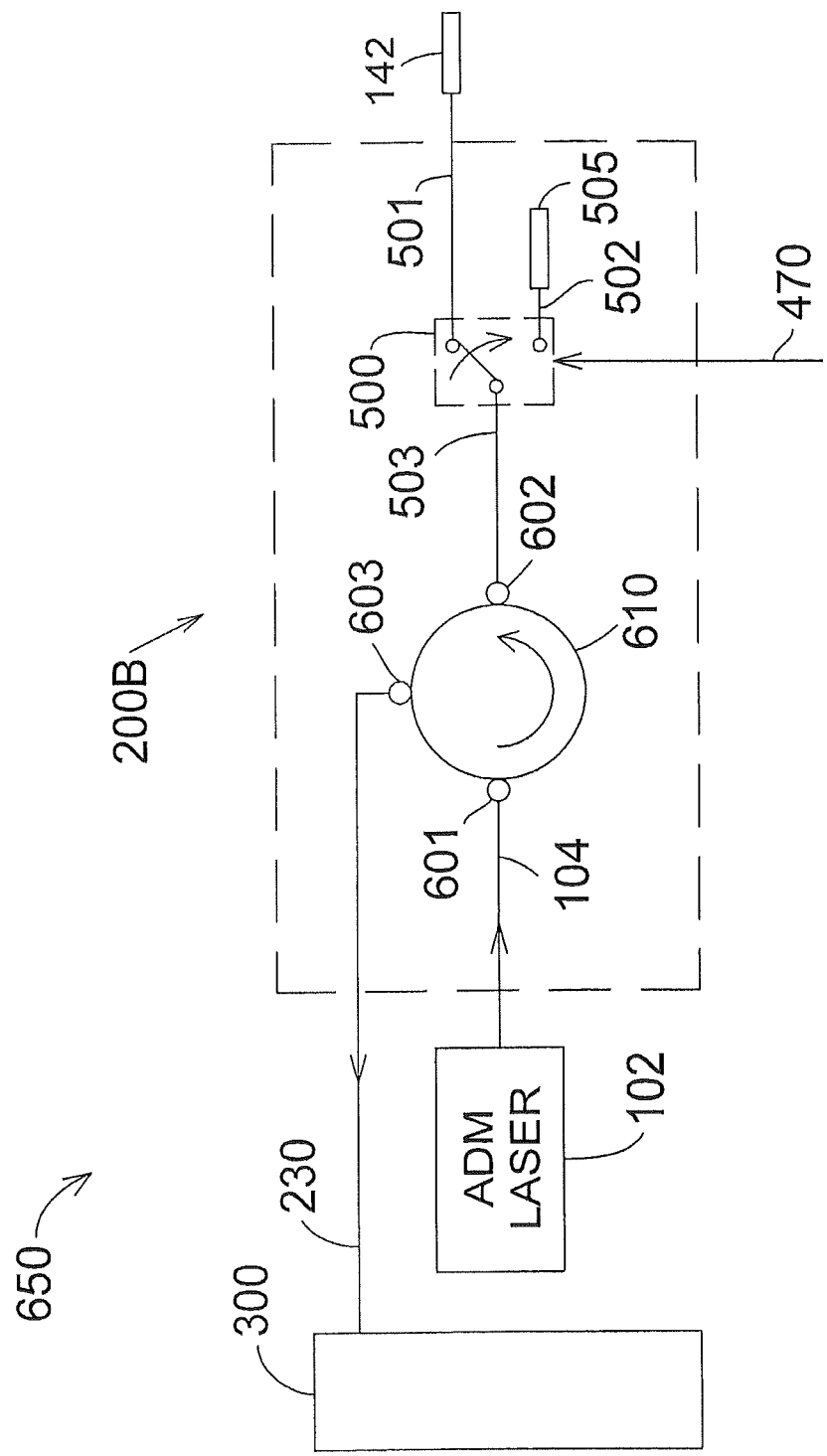
FIG. 6 shows an optical fiber switching network that includes a fiber optic switch, optical circulator, and partial fiber retroreflector according to another embodiment of the present invention.

A second fiber switching network 200B is shown in ADM system 650 of FIG. 6. ADM system 650 comprises ADM laser 102, fiber switching network 200B, ADM electronics 300, and stable ferrule 142. Fiber switching network 200B comprises optical circulator 610, fiber-optic switch 500, partial fiber retroreflector 505, interconnecting optical fibers 104, 230, 501, 502, 503, and electrical connection 470. Light travels from ADM laser 102 through optical fiber 104 into port 601 and out port 602 to fiber 503. From fiber 503, the light travels as described above for ADM system 550. Return light passes back through port 602 and out port 603 to optical fiber 230.

The advantage of a three-port circulator, such as 610 in FIG. 6, compared to a four-port fiber optic coupler, such as 206 in FIG. 5, is that no power is lost to the fourth port, which in 206 of FIG. 5 is dissipated in low-reflection termination 208. The disadvantage of a circulator is that it will generally have some level of polarization mode dispersion (PMD). As a result, any change in polarization state of light returned on optical fiber 501 or 502 can result in a delay in the phase of the modulated light, thereby producing an error in the reported ADM distance.

Figure 7:
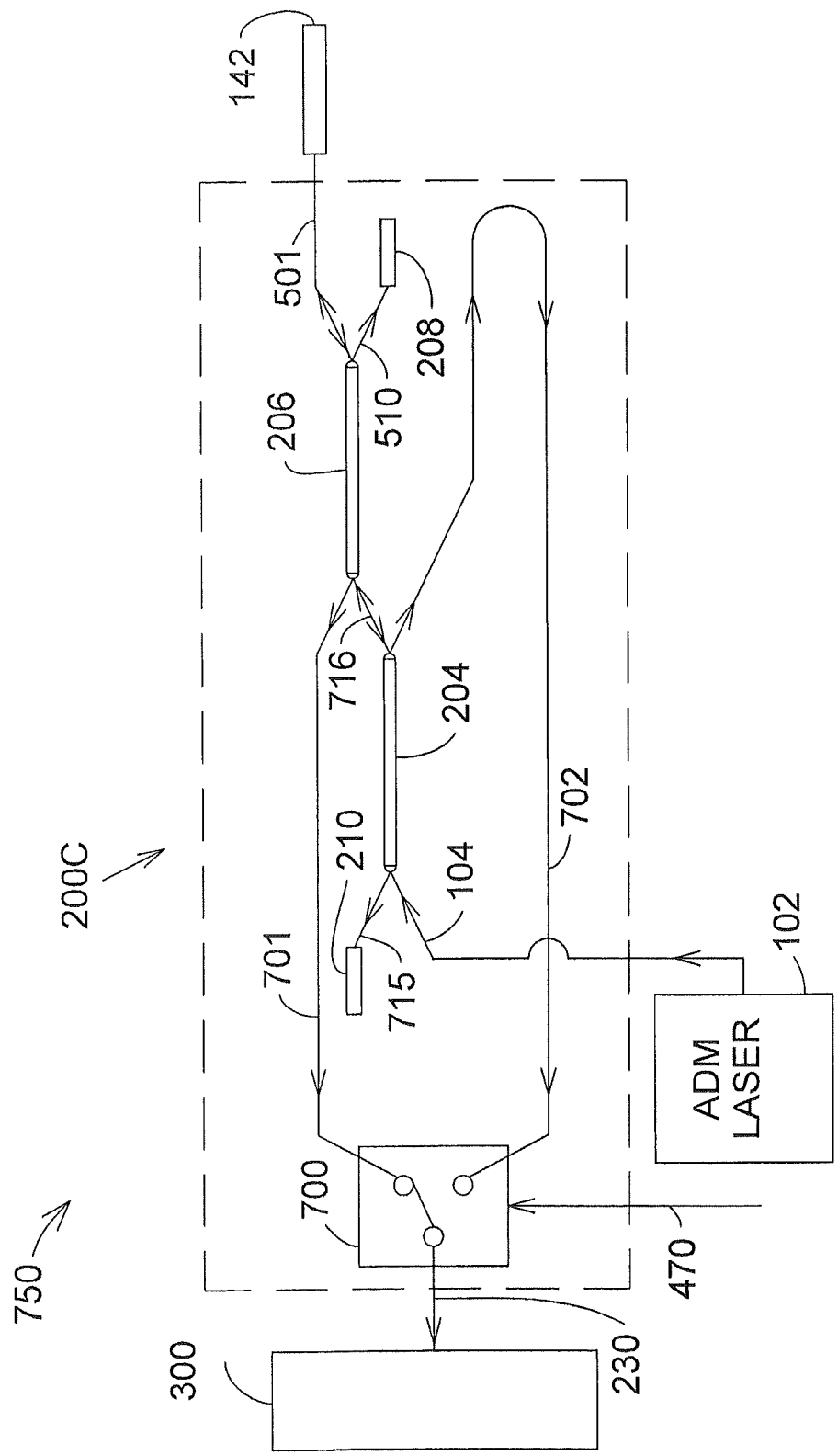
FIG. 7 shows an optical fiber switching network that includes two fiber optic couplers and a fiber-optic switch according to yet another embodiment of the present invention.

A third fiber switching network 200C is shown in ADM system 750 of FIG. 7. ADM system 750 comprises ADM laser 102, fiber switching network 200C, ADM electronics 300, and stable ferrule 142. Fiber switching network 200C comprises fiber-optic coupler 204, fiber-optic coupler 206, low-reflection terminations 208, 715, fiber switch 700, interconnecting optical fibers 104, 230, 501, 510, 701, and 716, and electrical connection 470. Light travels from ADM laser 102 through optical fiber 104 to first optical coupler 204. Part of the light from first optical coupler 204 travels through a reference optical fiber 702 to switch 700, and the other part travels through optical fiber 716 to second optical coupler 206. Part of the light from second optical coupler 206 travels through optical fiber 510 to low reflection termination 208, and the other part travels through optical fiber 501 to stable ferrule 142.

Light returned to stable ferrule 142 travels back through optical fiber 501 to second optical coupler 206. Part of the return light from second optical coupler 206 travels to optical switch 700. Another part of the return light from second optical coupler 206 travels back through optical fiber 716 to first optical coupler 204. Part of this return light goes through optical fiber 104 to ADM laser 102, where it is blocked by a Faraday isolator built into the laser. Another part of the return light travels through optical fiber 715 to low reflection termination 210.

In the measure mode, electrical connection 470 causes switch 700 to connect optical fiber 701 to ADM electronics 300. In the reference mode, electrical connection 470 causes switch 700 to connect optical fiber 702 to ADM electronics 300. Compared to ADM system 550, ADM system 750 has the advantage of not requiring partial fiber retroreflector 208. It has the disadvantage of requiring an extra fiber-optic coupler, an extra low-reflection termination, and an additional optical fiber 702.

Figure 8:
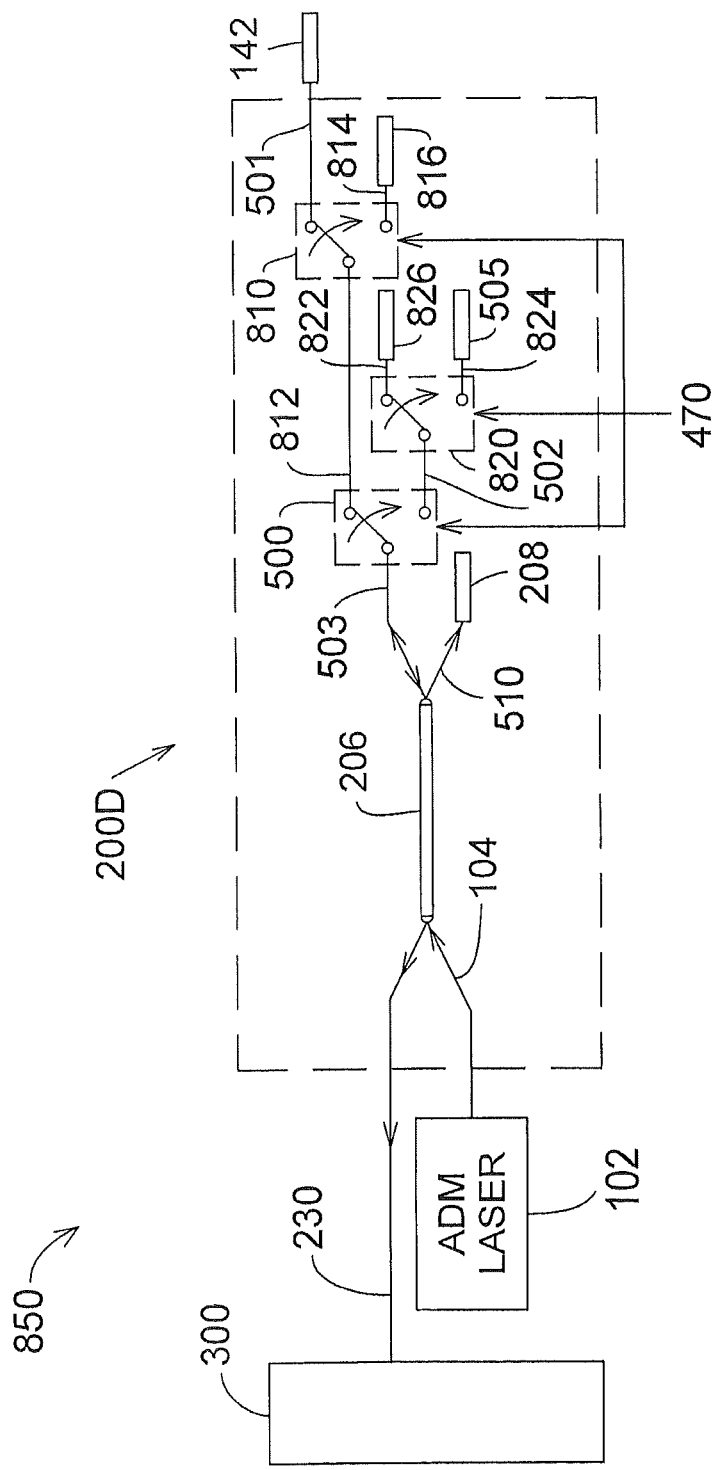
FIG. 8 shows an optical fiber switching network in which multiple fiber optic switches are combined to increase optical isolation according to still another embodiment of the present invention.

A fourth fiber switching network 200D is shown in ADM system 850 of FIG. 8. ADM system 850 comprises ADM laser 102, fiber switching network 200D, ADM electronics 300, and stable ferrule 142. Fiber switching network 200D comprises fiber-optic coupler 206, fiber switches 500, 810, 820, low-reflection terminations 208, 816, 826, partial fiber retroreflector 505, interconnecting optical fibers 104, 230, 501, 502, 503, 510, 812, 814, 822, 824, and electrical connection 470. Fourth fiber switching network configuration 850 is a modification of ADM system 550 shown in FIG. 5 to increase the isolation between the measure and reference channels by adding cascaded switches 810 and 820.

In the measure mode, switch 500 connects optical fiber 503 to optical fiber 812, and switch 810 connects optical fiber 812 to optical fiber 501. Also, in the measure mode, switch 820 connects optical fiber 502 to optical fiber 822 that leads to low-reflection termination 826. Suppose that the isolation of each switch 500, 810, 820 is 20 dB. This means, for example, that less than 0.01 of the optical power will pass through to the undesired path in a particular switch. In this case, less than 0.01 of the optical power present on optical fiber 503 will pass to optical fiber 502, and less than 0.0001 will pass to fiber 824. This light reflected by partial fiber retroreflector 505 will be further reduced by a factor of 0.0001 in passing back to optical fiber 503. In other words, the reflected optical power is decreased by a factor of at least $10^{-8}=-80$ dB compared to the outgoing optical power on optical fiber 503.

In the reference mode, switch 500 connects optical fiber 503 to optical fiber 502, and switch 820 connects optical fiber 502 to optical fiber 824 that leads to partial fiber retroreflector 505. Also, in the reference mode, switch 810 connects optical fiber 812 to optical fiber 814 that leads to low-reflection termination 816. As in the previous case, for switches each having 20 dB of isolation, the resulting power returned to optical fiber 503 is reduced to less than $10^{-8}=80$ dB times the original amount.

Figure 9:
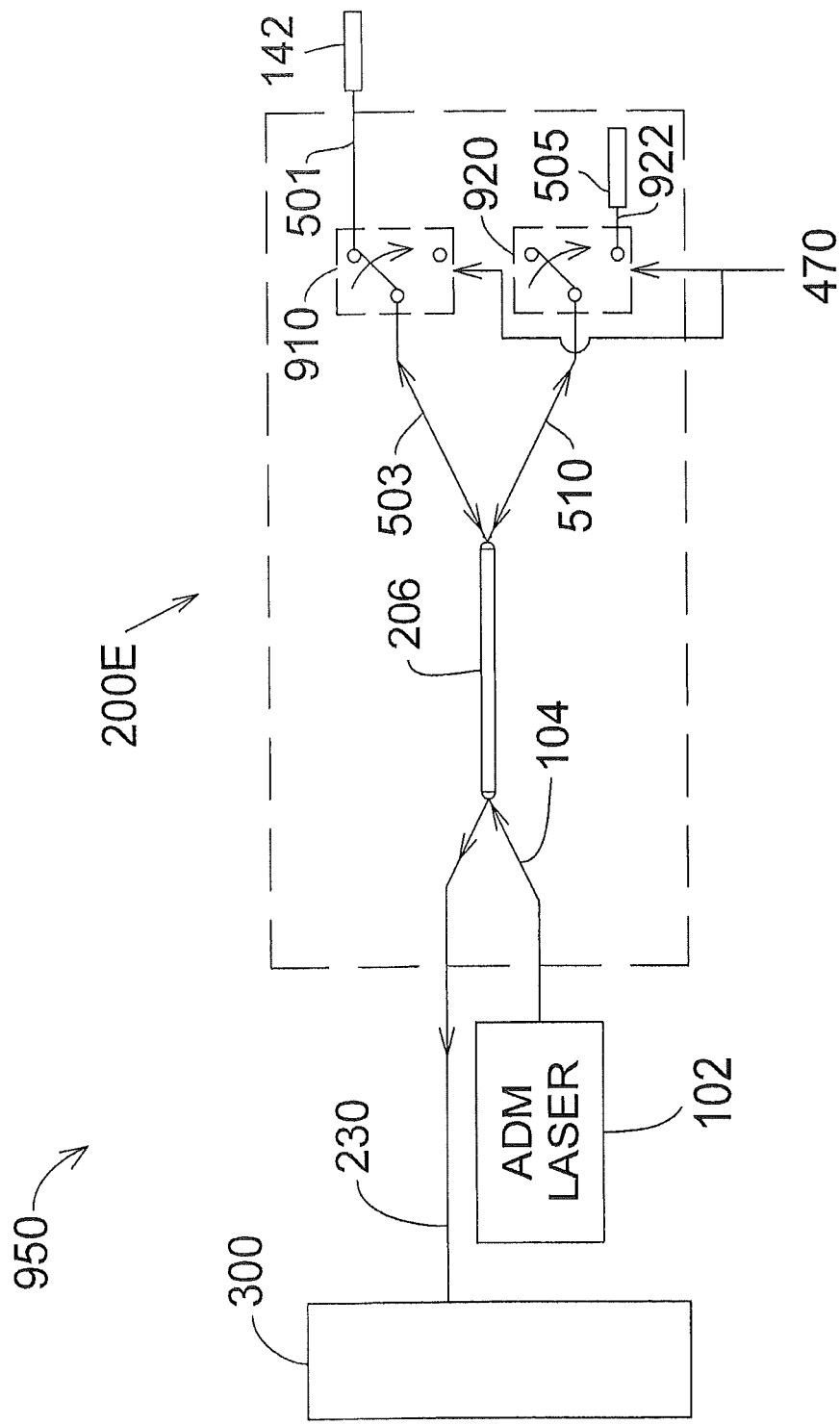
FIG. 9 shows an optical fiber switching network in which the switching action is performed by optical modulators or optical attenuators according to another embodiment of the present invention.

A fifth fiber switching network 200E is shown in ADM system 950 of FIG. 9. ADM system 950 comprises ADM laser 102, fiber switching network 200E, ADM electronics 300, and stable ferrule 142. Fiber switching network 200E comprises fiber-optic coupler 206, optical modulators or attenuators 910, 920, partial fiber retroreflector 505, interconnecting optical fibers 104, 501, 503, 510, 922, 230, and electrical connection 470. ADM system 950 is like ADM system 550 of FIG. 5 except that 910, 920 are optical modulators or attenuators driven between minimum and maximum levels to act as single pole single throw (SPST) switches. If 910, 920 are optical modulators, these are preferably polarization independent and bidirectional in their operation. The operation of ADM system 950 is like that of ADM 850 described above.

Figure 10:
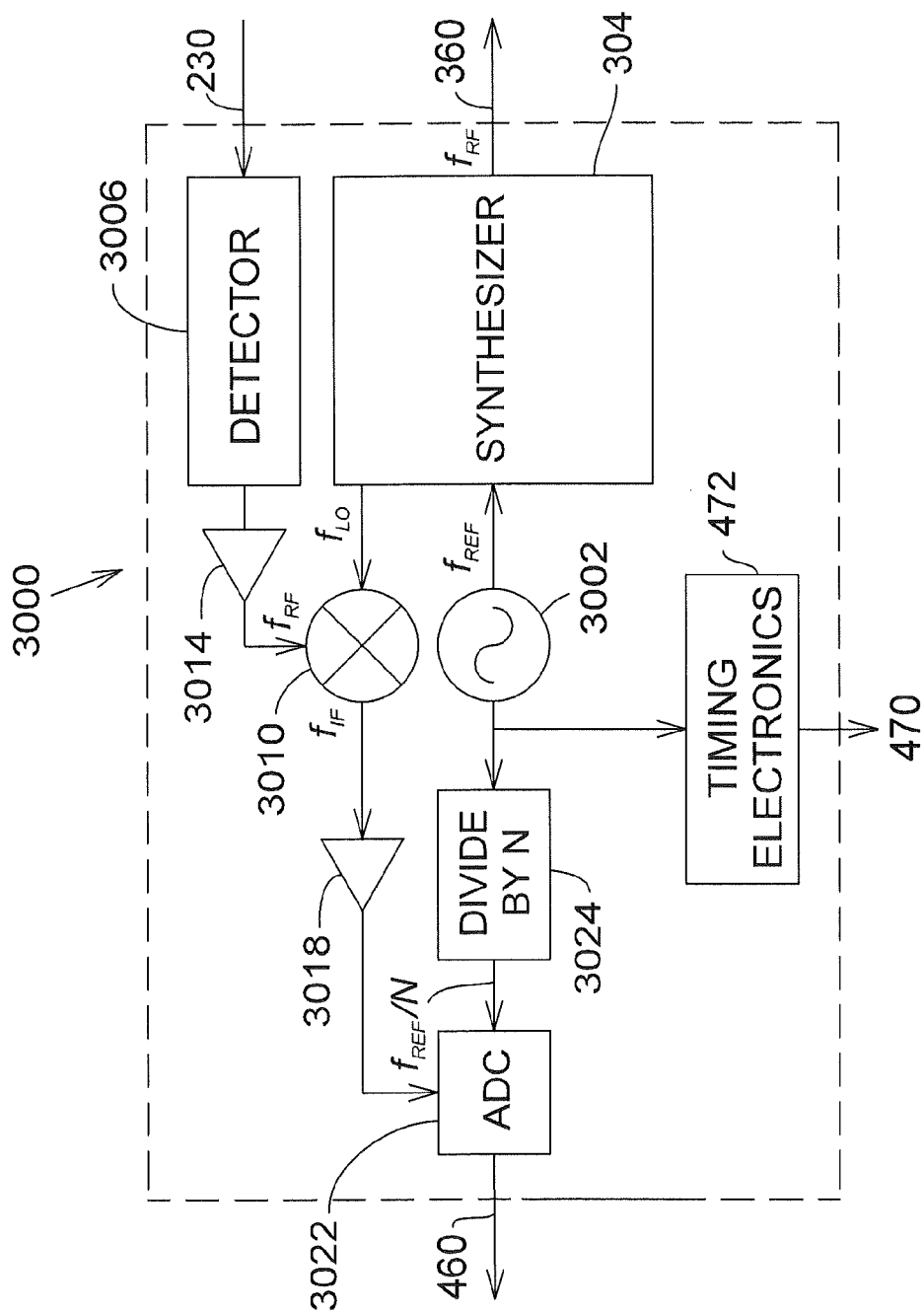
FIG. 10 is a block diagram of exemplary ADM electronics used in embodiments of the present invention.

A specific embodiment of ADM electronics 300 is now considered. This particular embodiment will be referred to as ADM electronics 3000 as is shown in FIG. 10. ADM electronics 3000 converts the light output of fiber switching network 200 in either the measure mode or reference mode into a digital electrical signal for processing by the data processor 400 and also generates modulation signal for ADM laser 102. The input to ADM electronics 3000 is fiber optic 230 and the outputs are electrical modulation signal 360 and conditioned electrical signal 460. U.S. Pat. No. 7,352,446 to Bridges et al., which is incorporated by reference, discloses details for similar ADM electronics 3000.

ADM electronics 3000 of FIG. 10 comprises frequency reference 3002, synthesizer 3004, detector 3006, mixers 3010, amplifiers 3014, 3018, frequency divider 3024, and analog-to-digital converter (ADC) 3022. Frequency reference 3002 provides the time base for the ADM and should have low phase noise and low frequency drift. The frequency reference may be an oven-controlled crystal oscillator (OCXO), rubidium oscillator, or any other highly stable frequency reference. Preferably the oscillator frequency should be accurate and stable to within a small fraction of a part per million. The signal from the frequency reference is put into the synthesizer, which generates three signals. The first signal is at frequency $f_{RF}$ and modulates the optical power of ADM laser 102. This type of modulation is called intensity modulation (IM). Alternatively, it is possible for the first signal at frequency $f_{RF}$ to modulate the electric field amplitude, rather than the optical power, of the laser light from ADM laser 102. This type of modulation is called amplitude modulation (AM). The second and third signals, both at the frequency $f_{LO}$, go to the local-oscillator ports of mixer 3010.

Fiber-optic cable 230 carries laser light. The light in this fiber-optic cable 230 is converted into electrical signals by detector 3006. This optical detector 3006 sends the modulation frequency $f_{RF}$ to amplifier 3014 and then to mixers 3010. Mixer 3010 produces two frequencies, one at $|f_{LO}-f_{RF}|$ and one at $|f_{LO}+f_{RF}|$. These signals travel to low-frequency amplifier 3018. Amplifier 3018 blocks the high-frequency signals so that only the signals at the intermediate frequency (IF), $f_{IF}=|f_{LO}-f_{RF}|$ pass through to the analog-to-digital converter (ADC) 3022. The frequency reference 3002 sends a signal into frequency divider 3024, which divides the frequency of the reference 3002 by an integer N to produce a sampling clock. In general, the ADC may decimate the sampled signals by an integer factor M, so that the effective sampling rate is $f_{REF}/NM$. This effective sampling rate should be an integer multiple of the intermediate frequency $f_{IF}$.

The timing electronics 472 may comprise a frequency divider chip and a microprocessor or field-programmable gate array. The frequency divider chip divides the frequency of the signal from frequency reference 3002 to a lower frequency. This frequency is applied to the microprocessor or field-programmable gate array that uses its internal processing capability to provide the required timing signals shown in FIGS. 13 and 14.

Here are frequencies for an exemplary ADM: The frequency reference is $f_{REF}=20$ MHz. The synthesizer RF frequency that drives the laser is $f_{RF}=2800$ MHz. The synthesizer LO frequency that is applied to the mixers is $f_{LO}=2800.01$ MHz. The difference between the LO and RF frequencies is the intermediate frequency of $f_{IF}=10$ kHz. The frequency reference is divided by N=10, to produce a 2-MHz frequency that is applied to the ADC as a sampling clock. The ADC has a decimation factor of M=8, which produces an effective sampling rate of 250 kHz. Since the IF is 10 kHz, the ADC takes 25 samples per cycle.

The ADC sends the sampled data to data processor 400 for analysis. Data processors include digital signal processor (DSP) chips and general-purpose microprocessor chips. The processing performed by these processors is described below.

As shown in FIGS. 2-4, ADM electronics 3000 generates a signal that travels over electrical connection 470 to switch fiber switching network 200 between measure and reference modes. In addition, data processor 400 converts the digital output of ADM electronics 3000 to result 420, which is a numerical distance value. One exemplary embodiment of data processor 400 is data processor 400A shown in FIG. 11. The input to data processor 400A is electrical interface 460 to ADM electronics 3000 and the output is result 420. U.S. Pat. No. 7,352,446, incorporated by reference above, also discloses details for a similar data processor 400.

Figure 11:
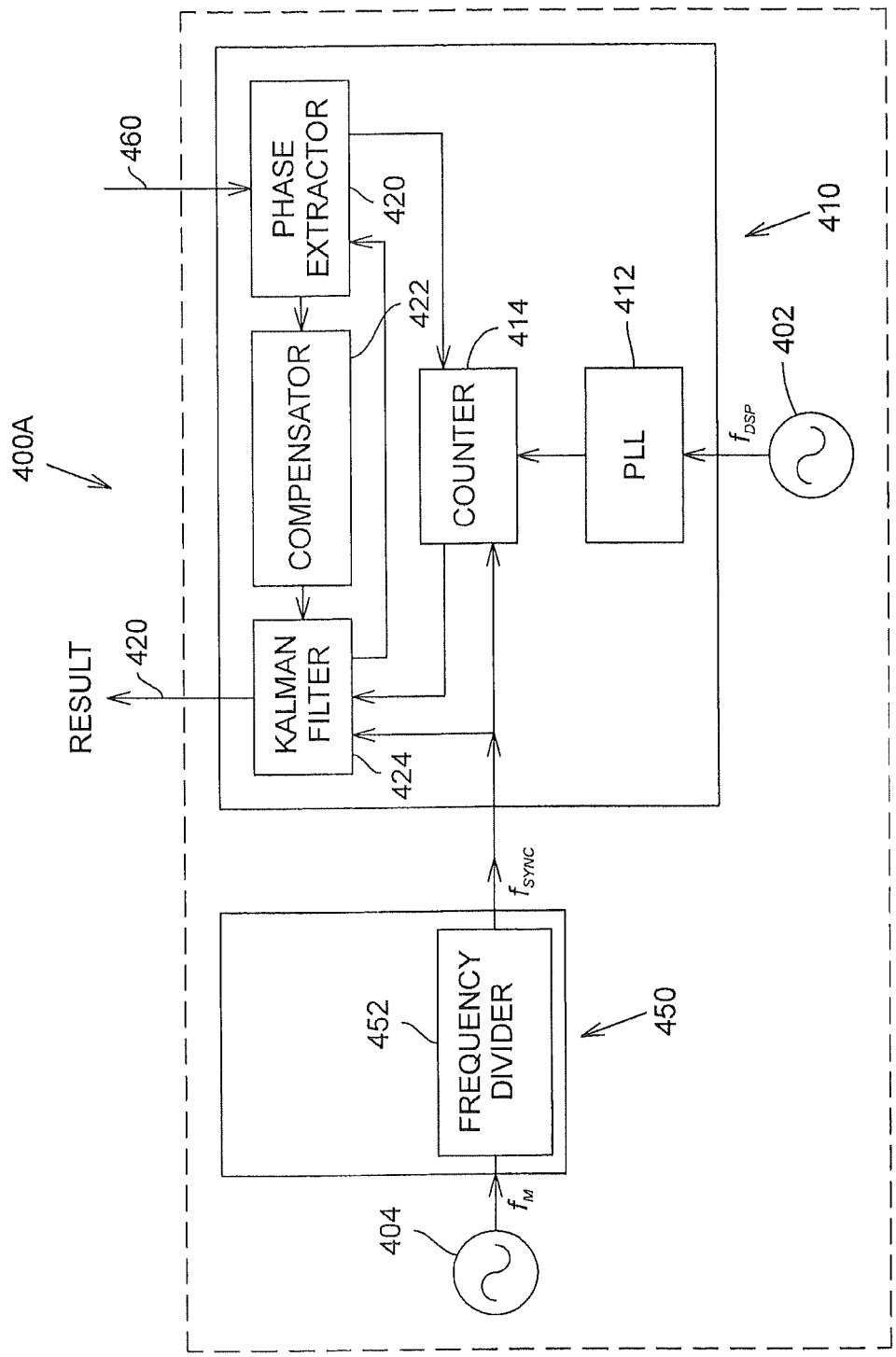
FIG. 11 is a block diagram of the data processor used in embodiments of the present invention.

Data processor 400 of FIG. 11 takes the digitized data from ADC 3022 and derives from it the distance from the tracker to external retroreflector 26. FIG. 11 refers to this distance as the RESULT 420. Data processor 400 comprises digital signal processor 410, microprocessor 450, and crystal oscillators 402, 404.

Analog-to-digital converter 3022 sends sampled data to DSP 410. This data is routed to a program that runs within the DSP. This program contains three main functions: phase-extractor function 420, compensator function 422, and Kalman-filter function 424. The purpose of the phase-extractor function is to determine the phases of the signals, that is, the phases of the signals that pass through the detector 3006. To determine these phases, the modulation range must first be calculated. Modulation range is defined as the round-trip distance traveled by the ADM laser light in air for the phase of the laser modulation to change by 2 pi radians.

To synchronize the ADM measurement to the measurements of the angular encoders and position detector, counter 414 determines the difference in time between the sync pulse and the last state distance. It does this in the following way. Crystal oscillator 404 sends a low-frequency sine wave to frequency divider 452, located within microprocessor 450. This clock frequency is divided down to $f_{SYNC}$, the frequency of the sync pulse. The sync pulse is sent over a device bus to DSP, angular encoder electronics, and position-detector electronics. In an exemplary system, the oscillator sends a 32.768 kHz signal through frequency divider 452, which divides by 32 to produce a sync-pulse frequency $f_{SYNC}$=1.024 kHz. The sync pulse is sent to counter 414, which resides within DSP 410. The counter is clocked by crystal 402, which drives a phase-locked loop (PLL) device 412 within the DSP. In the exemplary system, oscillator 402 has a frequency of 30 MHz and PLL 412 doubles this to produce a clock signal of 60 MHz to counter 414. The counter 414 determines the arrival of the sync pulse to a resolution of 1/60 MHz=16.7 nanoseconds. The phase-extractor function 420 sends a signal to the counter when the ADC 322 has sent all the samples for one cycle. This resets counter 414 and begins a new count. The sync pulse stops the counting of counter 412. The total number of counts is divided by the frequency to determine the elapsed time. Since the time interval in the above equations was set to one, the normalized time interval $t_{NORM}$ is the elapsed time divided by the time interval. The state distance $x_{EXT}$ extrapolated to the sync pulse event is $$x_{EXT}=x_k+v_k t_{NORM}.$$

The Kalman-filter function 424 provides the result, which is the distance from the tracker to external retroreflector 26.

It is important to recognize that the method of using fiber-optic switches described herein is not limited to a phase-based distance measurement method, of which the exemplary embodiment of FIG. 10 is one example. For example, fiber optic switches can equally well be used with a pulsed time-of-flight distance meter.

Figure 12:
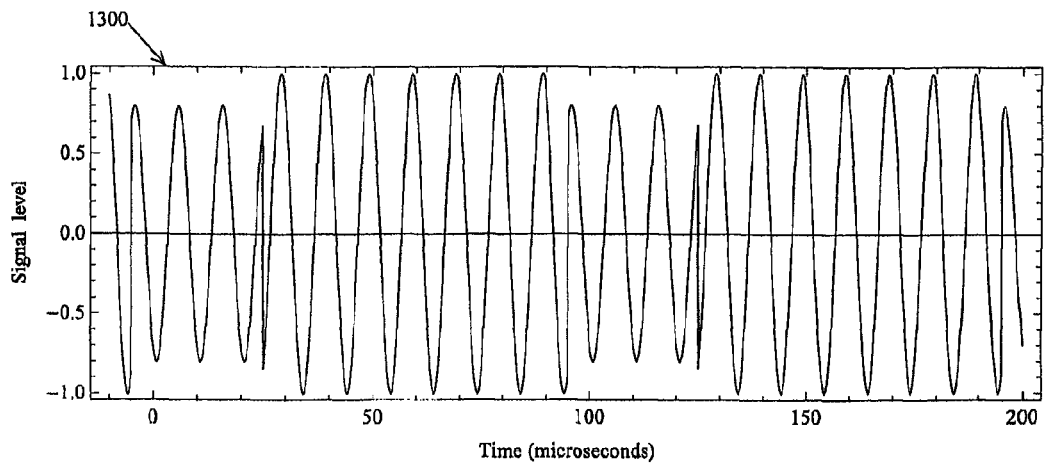
FIG. 12 is a graph of an exemplary signal from an ADM system.

FIG. 12 shows an example of the multiplexed 1300 signal that emerges from signal conditioner 3018 of FIG. 10 and enters analog-to-digital converter (ADC) 3022 of the same figure. This type of multiplexed signal might be produced by a phase-based ADM. In FIG. 12, the larger amplitude represents the signal from the measure channel, and the smaller amplitude represents the signal from the reference channel. The reference and measure signals are multiplexed together by fiber switching network 200. In the example shown in FIG. 12, the frequency of the sinusoidal is 100 kHz, and the corresponding period is 0.01 milliseconds=10 microseconds. Numerical result 420 has, in this example, an output frequency of 10 kHz and a corresponding period of 0.1 milliseconds=100 microseconds.

In general, the act of switching between measure and reference signals causes some transients to appear in the output signals of electrical and opto-electric components of ADM electronics 3000. If these transient signals, which are read by ADC 3022, were included in the calculations of data processor 400, an erroneous result 420 would occur. To avoid this problem, it is important that transients have died out in the raw data processed by data processor 400 to get result 420.

In the example considered here, only 80 microseconds of each 100 microsecond period are processed, and the other 20 microseconds are discarded. Of the 80 microseconds that are retained, 20 microseconds (2 sinusoidal periods) are retained from the reference channel and 60 microseconds (6 sinusoidal periods) are retained from the measure channel.

Figure 13:
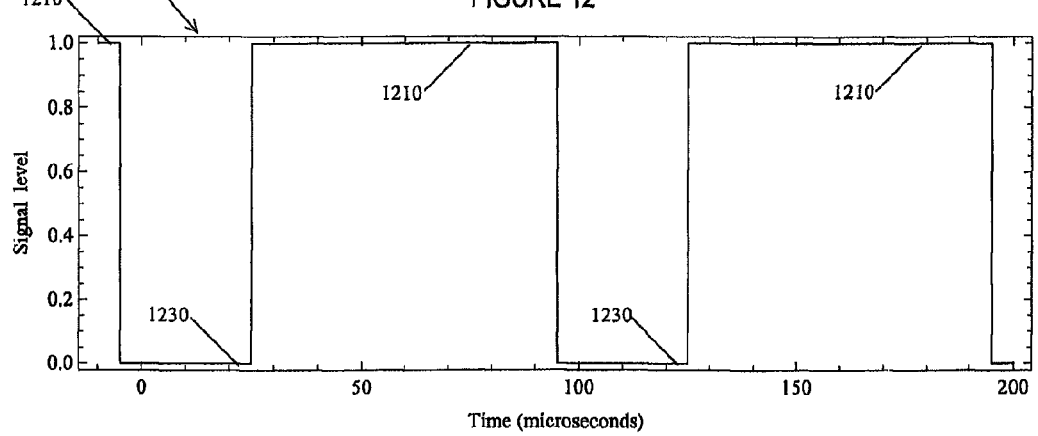
FIG. 13 is a graph of an exemplary switching signal.
Figure 14:
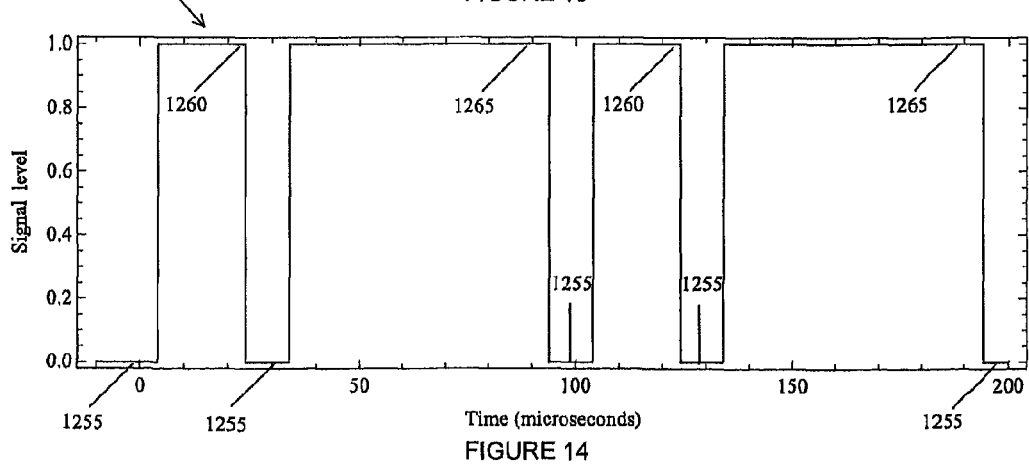
FIG. 14 is a graph of an exemplary gating signal.

FIG. 13 shows timing signal 1200 from electrical connection 470. Measure mode begins when timing signal 1200 goes to high value 1210, and reference mode begins when timing signal 1200 goes to low value 1230. FIG. 14 shows the gating signal 1250 that indicates when data 460 is considered valid. A high gating signal 1260 indicates that the reference signal is valid. A high gating signal 1265 indicates that the measure signal is valid. A low gating signal 1255 indicates that no signal is valid.

Figure 15:
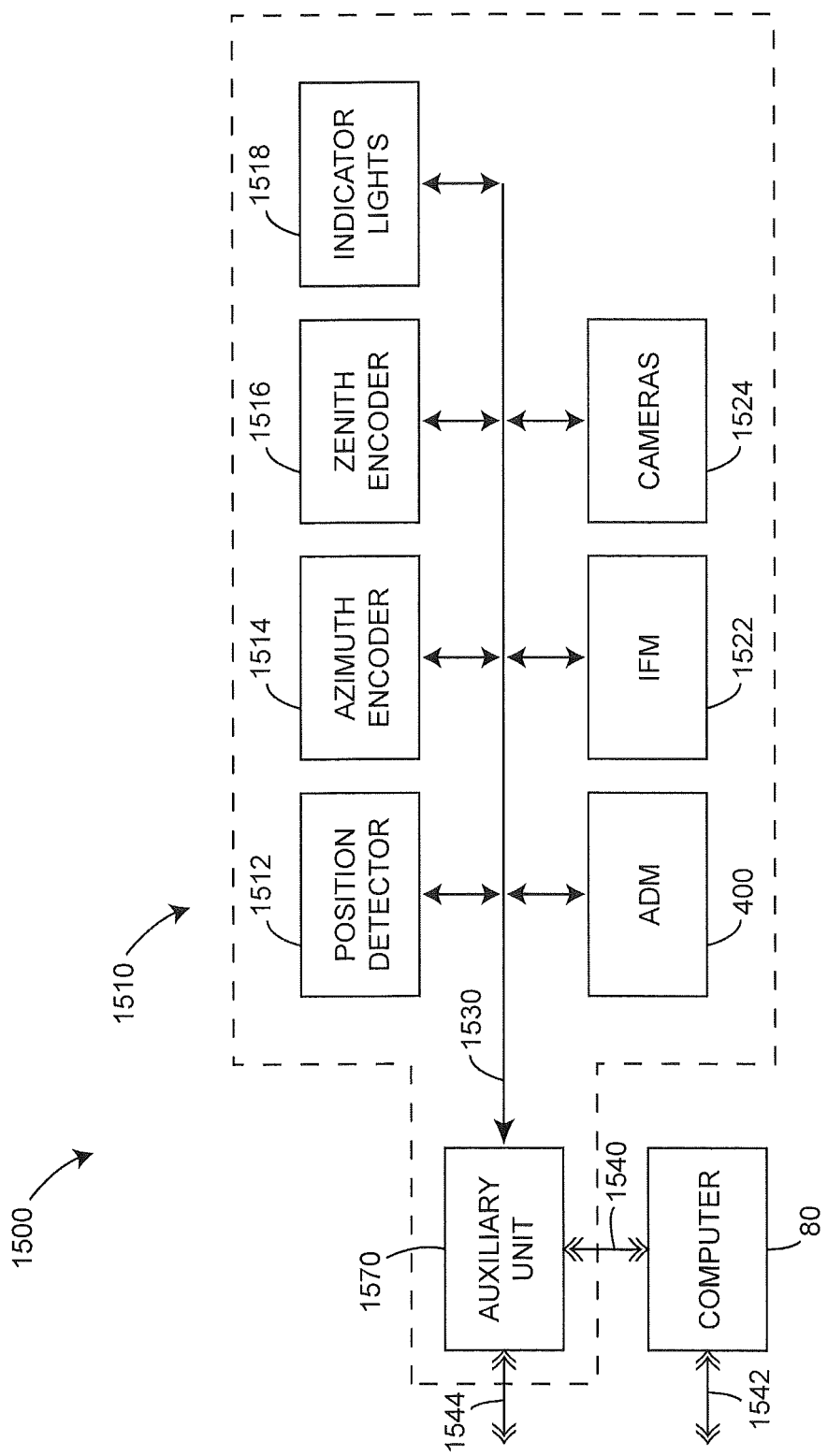
FIG. 15 is a block diagram of a processing system used in embodiments of the present invention.

The methods of algorithms discussed above are implemented by means of processing system 1500 shown in FIG. 15. Processing system 1500 comprises tracker processing unit 1510 and optionally computer 80. Processing unit 1510 includes at least one processor, which may be a microprocessor, digital signal processor (DSP), field programmable gate array (FPGA), or similar device. Processing capability is provided to process information and issue commands to internal tracker processors. Such processors may include position detector processor 1512, azimuth encoder processor 1514, zenith encoder processor 1516, indicator lights processor 1518, ADM processor 400, interferometer (IFM) processor 1522, and camera processor 1524. Auxiliary unit processor 1570 optionally provides timing and microprocessor support for other processors within tracker processor unit 1510. Preferably, it communicates with other processors by means of device bus 1530, which preferably transfers information throughout the tracker by means of data packets, as is well known in the art. Preferably, computing capability is distributed throughout tracker processing unit 1510, with DSPs and FPGAs performing intermediate calculations on data collected by tracker sensors. The results of these intermediate calculations are returned to auxiliary unit processor 1570. Auxiliary unit 1570 may be attached to the main body of laser tracker 10 through a long cable, or it may be pulled within the main body of the laser tracker so that the tracker attaches directly (and optionally) to computer 80. Preferably, auxiliary unit 1570 is connected to computer 80 by connection 1540, which is preferably an Ethernet cable or wireless connection. Auxiliary unit 1570 and computer 80 may be connected to the network through connections 1542, 1544, which are preferably Ethernet cables or wireless connections.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An absolute distance meter that determines a distance to a target, comprising:
   a light source that emits a light beam;
   a fiber switching network having at least one optical switch that switches between at least two routes in response to a switch control signal, a first one of the routes enabling a measure mode in which the light beam is emitted from the fiber switching network through an end of an optical fiber towards the target and is reflected back through the end of the optical fiber as a measure light beam and back into the fiber switching network, a second one of the routes enabling a reference mode in which the light beam comprises a reference light beam within the fiber switching network;

a single channel detector that detects the measure and reference light beams in a temporally spaced multiplexed manner and provides an electrical signal which corresponds to the detected measure and reference light beams;

a single channel signal processor that processes the electrical signal and provides a conditioned electrical signal in response thereto;

electronics that controls timing of the switch control signal; and a data processor that processes the conditioned electrical signal to determine the distance to the target.

2. The absolute distance meter of claim 1, wherein the light source comprises a laser or superluminescent diode and wherein the light beam is a laser light beam or a superluminescent diode light beam.

3. The absolute distance meter of claim 1, wherein the single channel signal processor provides a modulation signal to the light source to modulate the light beam power, polarization, wavelength, phase, or combinations thereof in a manner that is sinusoidal, pulsed, chirped, or combinations thereof.

4. The absolute distance meter of claim 1, wherein the single channel signal processor provides the switch control signal to control the switching of the at least one optical switch between the measure mode route and the reference mode route.

5. The absolute distance meter of claim 1, wherein the absolute distance meter is for use within a laser tracker, total station, laser scanner, or handheld device.

6. The absolute distance meter of claim 1, wherein the fiber switching network further comprises:
at least one fiber optic coupler through which the emitted light beam and the measure and reference light beams pass; and
a partial fiber retroreflector;
wherein the at least one fiber optic coupler is optically connected to the single channel detector, to the light source, and to the at least one optical switch;
wherein in the measure mode the emitted light beam is sent from the light source through the at least one fiber optic coupler to the at least one optical switch that is in the measure mode route and to the target, and wherein the measure light beam from the target passes through the at least one optical switch that is in the measure mode route and through the at least one fiber optic coupler and to the single channel detector; and
wherein in the reference mode the emitted light beam is sent from the light source through the at least one fiber optic coupler to the at least one optical switch that is in the reference mode route and to the partial fiber retroreflector, and wherein the reference light beam reflected from the partial fiber retroreflector passes through the at least one optical switch that is in the reference mode route and through the at least one fiber optic coupler and to the single channel detector.

7. The absolute distance meter of claim 1, wherein the fiber switching network further comprises:
an optical circulator through which the emitted light beam and the measure and reference light beams pass; and
a partial fiber retroreflector;
wherein the optical circulator is optically connected to the single channel detector, to the light source, and to the at least one optical switch;
wherein in the measure mode the emitted light beam is sent from the light source through the optical circulator to the at least one optical switch that is in the measure mode route and to the target, and wherein the measure light beam from the target passes through the at least one optical switch that is in the measure mode route and through the optical circulator and to the single channel detector; and
wherein in the reference mode the emitted light beam is sent from the light source through the optical circulator to the at least one optical switch that is in the reference mode route and to the partial fiber retroreflector, and wherein the reference light beam reflected from the partial fiber retroreflector passes through the at least one optical switch that is in the reference mode route and through the optical circulator and to the single channel detector.

8. The absolute distance meter of claim 1, wherein the fiber switching network further comprises:
first and second fiber optic couplers through which the emitted light beam and the measure and reference light beams pass;
wherein the first fiber optic coupler is optically connected to the light source, to the at least one optical switch, and to the second fiber optic coupler;
wherein the second fiber optic coupler is optically connected to the first fiber optic coupler, to the at least one optical switch, and to the light source;
wherein in the measure mode the emitted light beam is sent from the light source through the first fiber optic coupler, through the second fiber optic coupler and to the target, and wherein the measure light beam from the target passes through the second fiber optic coupler and to the least one optical switch that is in the measure mode route and to the single channel detector; and
wherein in the reference mode the emitted light beam is sent from the light source through the first fiber optic coupler and to the at least one optical switch that is in the reference mode route, and to the single channel detector as the reference light beam.

9. The absolute distance meter of claim 1, wherein the fiber switching network further comprises:
at least one fiber optic coupler through which the emitted light beam and the measure and reference light beams pass;
second and third optical switches; and
a partial fiber retroreflector;
wherein the at least one fiber optic coupler is optically connected to the single channel detector, to the light source, and to the at least one optical switch;
wherein in the measure mode the emitted light beam is sent from the light source through the at least one fiber optic coupler to the at least one optical switch that is in the measure mode route, to the second optical switch that is in the measure mode route, and to the target, and wherein the measure light beam from the target passes through the second optical switch that is in the measure mode, through at least one optical switch that is in the measure mode route and through the at least one fiber optic coupler and to the single channel detector; and
wherein in the reference mode the emitted light beam is sent from the light source through the at least one fiber optic coupler to the at least one optical switch that is in the reference mode route, to the third optical switch that is in the reference mode route, and to the partial fiber retroreflector, and wherein the reference light beam reflected from the partial fiber retroreflector passes through the third optical switch that is in the reference mode route, through at least one optical switch that is in the reference mode route, and through the at least one fiber optic coupler and to the single channel detector.

10. The absolute distance meter of claim 1, wherein the fiber switching network further comprises:
   at least one fiber optic coupler through which the emitted light beam and the measure and reference light beams pass;
   a second optical switch; and
   a partial fiber retroreflector;
   wherein the at least one fiber optic coupler is optically connected to the single channel detector, to the light source, to the at least one optical switch, and to the second optical switch;
   wherein in the measure mode the emitted light beam is sent from the light source through the at least one fiber optic coupler to the at least one optical switch that is in the measure mode route and to the target, and wherein the measure light beam from the target passes through the at least one optical switch that is in the measure mode route and through the at least one fiber optic coupler and to the single channel detector; and
   wherein in the reference mode the emitted light beam is sent from the light source through the at least one fiber optic coupler to the second optical switch that is in the reference mode route and to the partial fiber retroreflector, and wherein the reference light beam reflected from the partial fiber retroreflector passes through the at least one optical switch that is in the reference mode route and through the at least one fiber optic coupler and to the single channel detector.

11. The absolute distance meter of claim 10, wherein the at least one optical switch and the second optical switch each comprises an optical modulator or attenuator that is driven between a first minimum level and a second maximum level in which the at least one optical switch and the second optical switch act as switches.

12. The absolute distance meter of claim 1, further comprising an optical assembly that receives the emitted light beam from the fiber switching network and transmits the emitted light beam towards the target, and that receives the measure light beam from the target and transmits the measure light beam toward the fiber switching network.

13. The absolute distance meter of claim 12, further comprising a visible laser light source that emits a visible laser, wherein the optical assembly includes optics that merges the emitted visible laser with the emitted light beam from the fiber switching network to form a composite emitted light beam and transmits the composite emitted light beam towards the target.

14. The absolute distance meter of claim 1, wherein the target is a retroreflector.

15. The absolute distance meter of claim 1, wherein the at least one optical switch comprises a second optical fiber that terminates in a low reflection termination.

16. The absolute distance meter of claim 1, wherein the light beam passes through the at least one optical switch in a first direction and the measure light beam passes through the at least one optical switch in a second direction opposite to the first direction.

17. The absolute distance meter of claim 1, wherein a second optical switch is cascaded with the at least one optical switch to increase isolation between the two routes.

18. An absolute distance meter that determines a distance to a target, comprising:
   a laser that emits a laser beam;
   a fiber switching network having an optical switch that switches between two routes in response to a switch control signal, a first route being a measure mode route in which the laser beam is emitted from the fiber switching network through an end of an optical fiber towards the target and is reflected back through the end of the optical fiber as a measure light beam into the fiber switching network, a second route being a reference mode route in which the light beam comprises a reference light beam within the fiber switching network;
   a single channel detector that detects the measure and reference light beams in a multiplexed manner and provides an electrical signal which corresponds to the detected measure and reference light beams;
   electronics that controls timing of the switch control signal; and
   a processor that processes the electrical signal to determine the distance to the target.

19. The absolute distance meter of claim 18, wherein the processor provides a modulation signal to the laser to modulate the laser.

20. The absolute distance meter of claim 18, wherein the processor provides the switch control signal to control the switching of the optical switch between the measure mode route and the reference mode route.

21. The absolute distance meter of claim 18, wherein the absolute distance meter is for use within a laser tracker, total station, laser scanner, or handheld device, and wherein the target comprises a retroreflector.

22. The absolute distance meter of claim 18, further comprising an optical assembly that receives the emitted light beam from the fiber switching network and transmits the emitted light beam towards the target, and that receives the measure light beam from the target and transmits the reference light beam towards the fiber switching network.

* * * * *